US012323738B2

(12) United States Patent
Oz et al.

(10) Patent No.: US 12,323,738 B2
(45) Date of Patent: Jun. 3, 2025

(54) GENERATING AN ALPHA CHANNEL

(71) Applicant: Cavendish Capital LLC, Wilmington, DE (US)

(72) Inventors: Ran Oz, Maccabim (IL); Eyal Gavish, Los Altos, CA (US); Rima Gandlin, Los Altos, CA (US)

(73) Assignee: Cavendish Capital LLC, Wilmington, DE (US)

( * ) Notice: Subject to any disclaimer, the term of this patent is extended or adjusted under 35 U.S.C. 154(b) by 361 days.

(21) Appl. No.: 17/653,026

(22) Filed: Mar. 1, 2022

(65) Prior Publication Data

US 2022/0191431 A1 Jun. 16, 2022

Related U.S. Application Data

(63) Continuation-in-part of application No. 17/539,036, filed on Nov. 30, 2021, now abandoned, and a
(Continued)

(51) Int. Cl.
| | |
|---|---|
| *G06T 7/11* | (2017.01) |
| *G06F 3/01* | (2006.01) |
| *G06N 3/04* | (2023.01) |
| *G06N 3/045* | (2023.01) |
| *G06T 7/70* | (2017.01) |

(Continued)

(52) U.S. Cl.
CPC ............. *H04N 7/157* (2013.01); *G06F 3/013* (2013.01); *G06N 3/04* (2013.01); *G06N 3/045* (2023.01); *G06T 7/11* (2017.01); *G06T 7/70* (2017.01); *G06T 15/04* (2013.01); *G06T 15/20* (2013.01); *G06T 15/205* (2013.01); *G06T 17/20* (2013.01); *G06T 19/00* (2013.01); *G06T 19/20* (2013.01); *H04N 7/144* (2013.01); *H04N 7/147* (2013.01); *H04N 7/152* (2013.01); *G06T 2200/08* (2013.01); *G06T 2207/30201* (2013.01); *G06T 2219/2004* (2013.01)

(58) Field of Classification Search
CPC .......... H04N 7/157; G06T 15/205; G06T 7/11
See application file for complete search history.

(56) References Cited

U.S. PATENT DOCUMENTS

| | | | | |
|---|---|---|---|---|
| 2011/0008017 A1* | 1/2011 | Gausereide | ............. | H04N 5/272 386/280 |
| 2012/0023456 A1* | 1/2012 | Sun | ......................... | G06T 7/194 715/863 |
| 2020/0357142 A1* | 11/2020 | Aydin | .................... | H04N 5/275 |

* cited by examiner

*Primary Examiner* — Matthew Salvucci
(74) *Attorney, Agent, or Firm* — Blank Rome LLP

(57) ABSTRACT

A method for generating alpha channel information related to a person, the method may include generating the alpha channel information related to the person by an alpha channel neural network; wherein the alpha channel machine learning process is trained using ground truth alpha channel information that is associated with background information; wherein the ground-truth alpha channel information is generated by: obtaining input images of the person; wherein each image comprises the person and an arbitrary background; repeating, for each input image of the input images, converting the input image, by a portrait matting predictor, to (a) a first colored background image that comprises the person and a background of a first color, and (b) a second colored background image that comprises the person and a background of a second color; wherein the first color differs from the second color.

20 Claims, 30 Drawing Sheets

Related U.S. Application Data continuation-in-part of application No. 17/304,378, filed on Jun. 20, 2021, now Pat. No. 11,805,157, said application No. 17/539,036 is a continuation of application No. 17/249,468, filed on Mar. 2, 2021, now Pat. No. 11,792,367, said application No. 17/304,378 is a continuation of application No. 17/249,468, filed on Mar. 2, 2021, now Pat. No. 11,792,367.

(60) Provisional application No. 63/201,713, filed on May 10, 2021, provisional application No. 63/199,014, filed on Dec. 1, 2020, provisional application No. 63/081,860, filed on Sep. 22, 2020, provisional application No. 63/023,836, filed on May 12, 2020.

(51) Int. Cl.
| | |
|---|---|
| *G06T 15/04* | (2011.01) |
| *G06T 15/20* | (2011.01) |
| *G06T 17/20* | (2006.01) |
| *G06T 19/00* | (2011.01) |
| *G06T 19/20* | (2011.01) |
| *H04N 7/14* | (2006.01) |
| *H04N 7/15* | (2006.01) |

Receiving direction of gaze information regarding a direction of gaze of each participant within a representation of a virtual 3D video conference environment that may be associated with the participant. 210

Determining, for each participant, updated 3D participant representation information within the virtual 3D video conference environment, that reflects the direction of gaze of the participant. 220

Generating, for at least one participant, an updated representation of virtual 3D video conference environment, the updated representation of virtual 3D video conference environment represents the updated 3D participant representation information for at least some of the multiple participants. 230

Displaying, by a device of a participant of the multiple participants, an updated representation of the virtual 3D video conference environment, the updated representation may be associated with the participant. 240

Transmitting the updated representation of virtual 3D video conference environment to at least one device of at least one participant. 250

One or more additional steps. 290

| 4101(1) | — — — | 4101(j) |
|---------|-------|---------|
| 4102(1) | — — — | 4102(k) |
| 4103(1) | — — — | 4103(m) |
| 4104(1) | — — — | 4104(n) |

FIG. 4

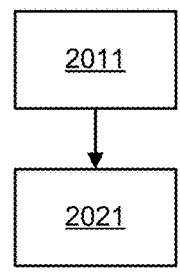
2001
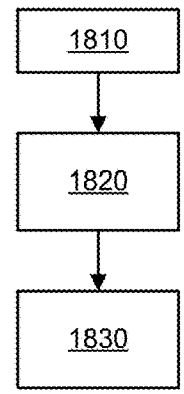
1800
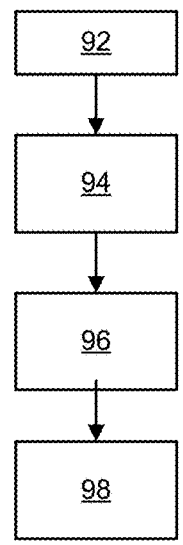
90
FIG. 6

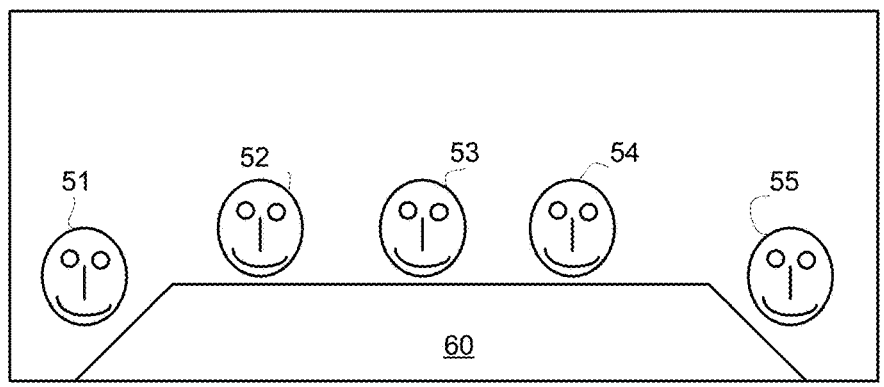
PANORAMIC VIEW 41
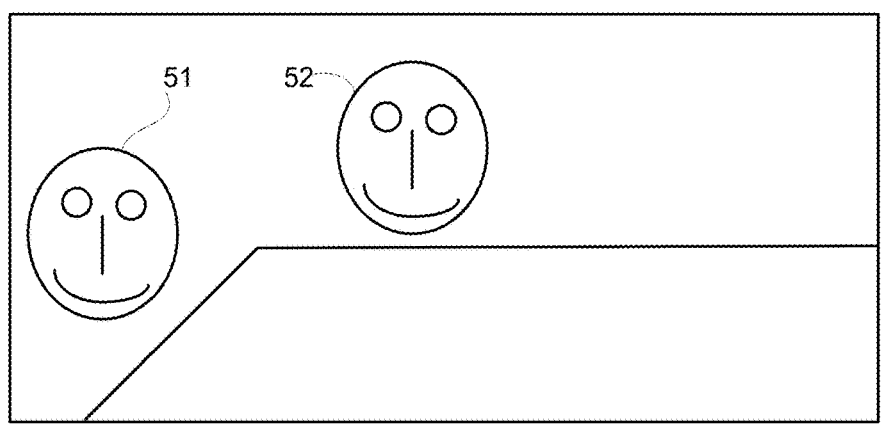
PARTIAL VIEW 42
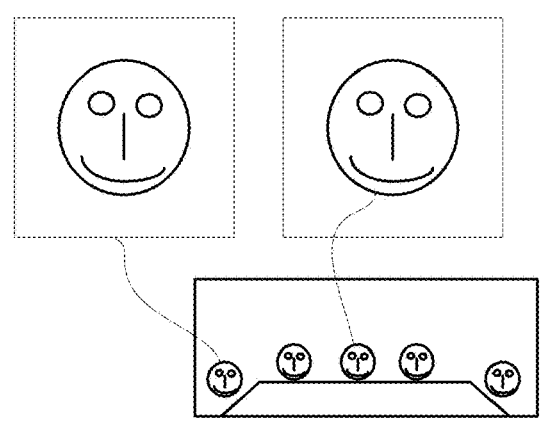
Hybrid view 43
FIG. 7

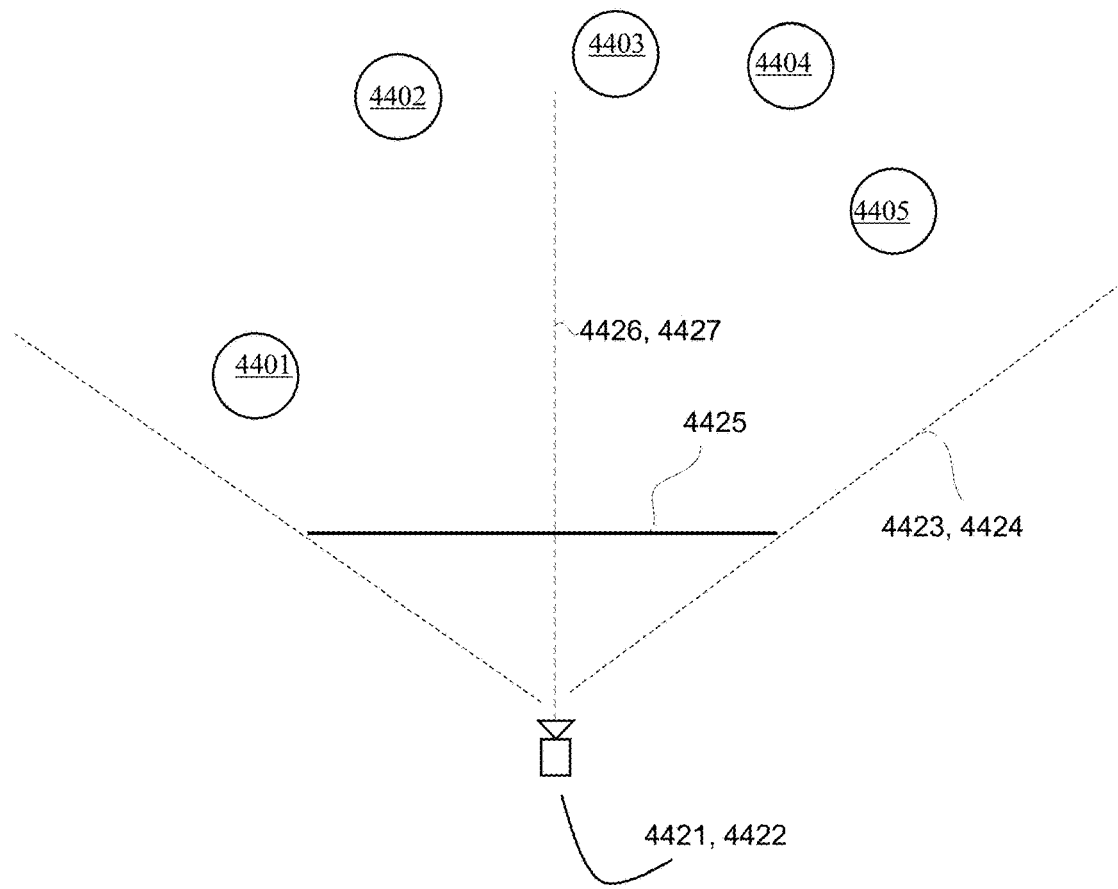
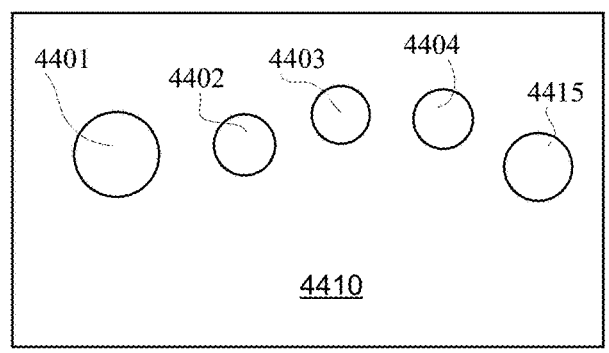
FIG. 8

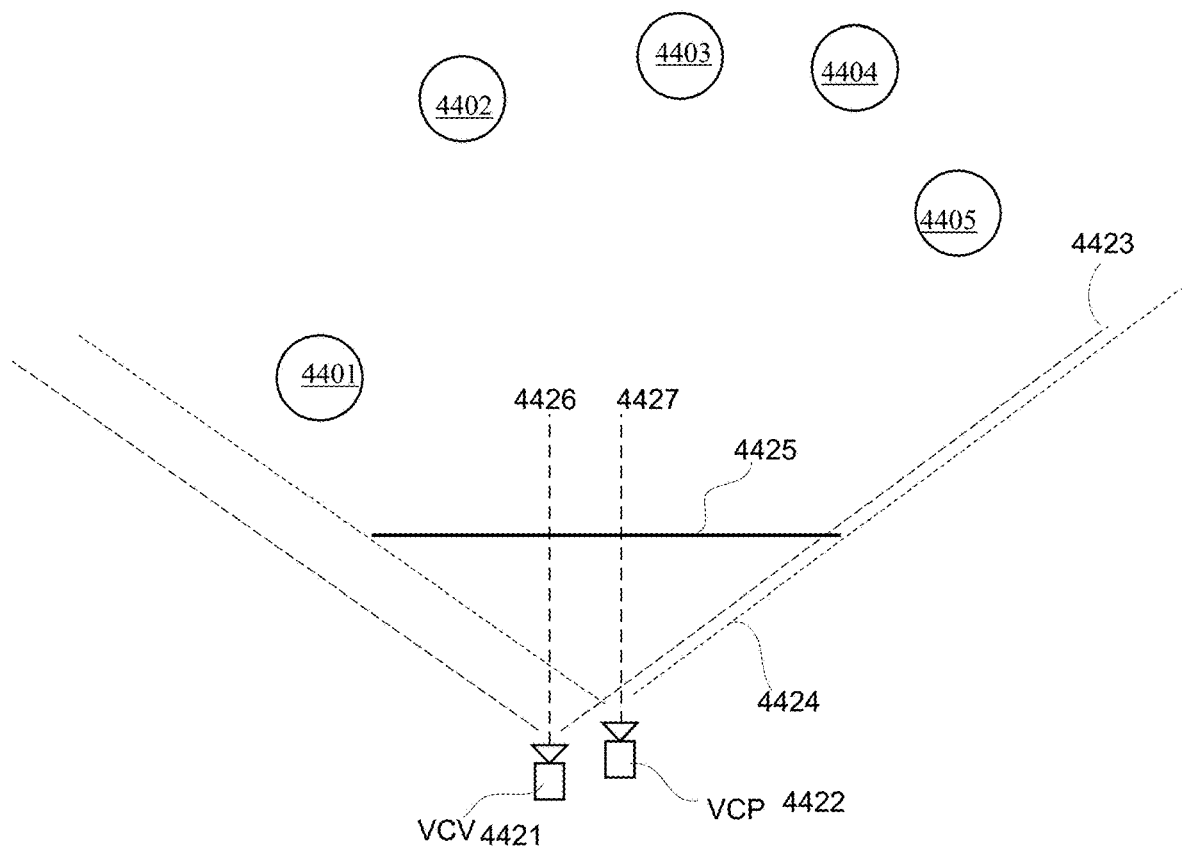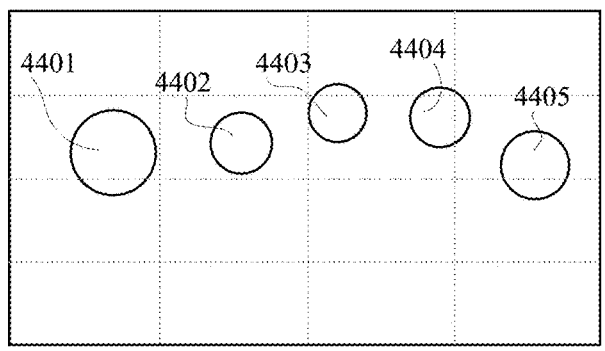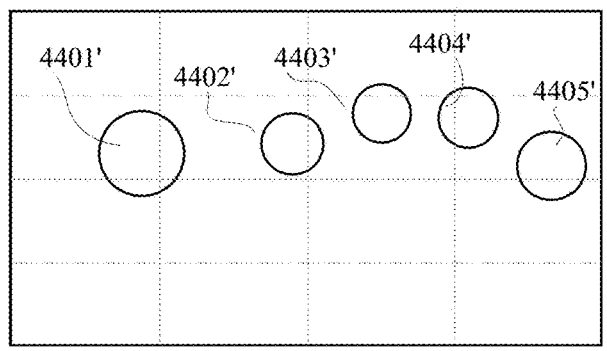
FIG. 9

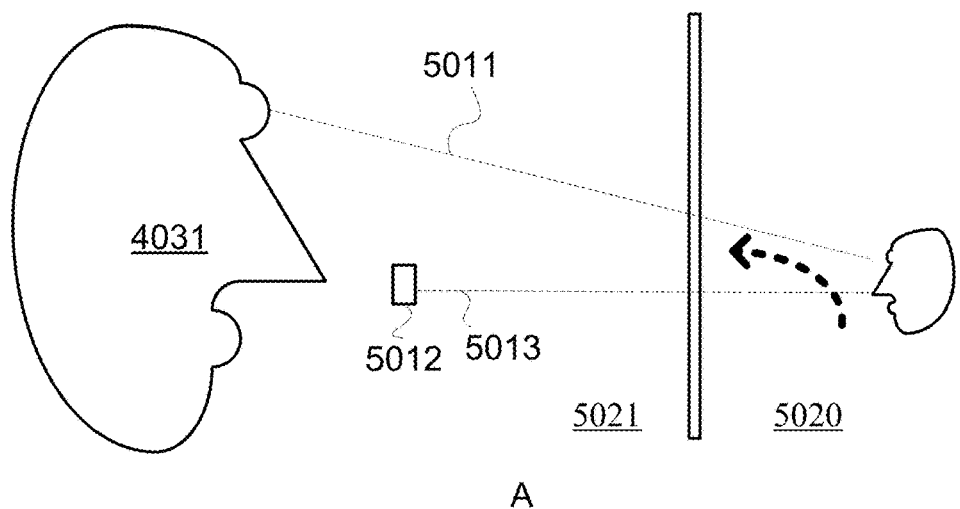
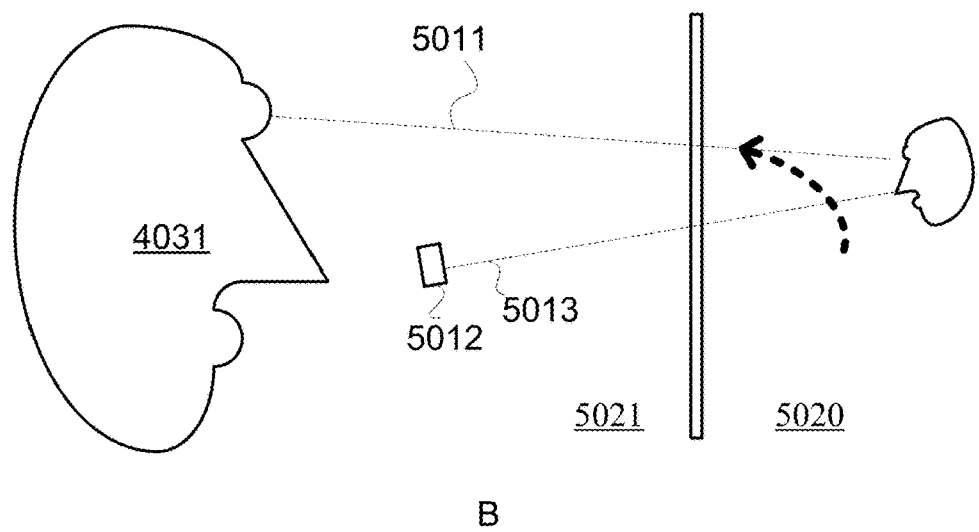
FIG. 15E

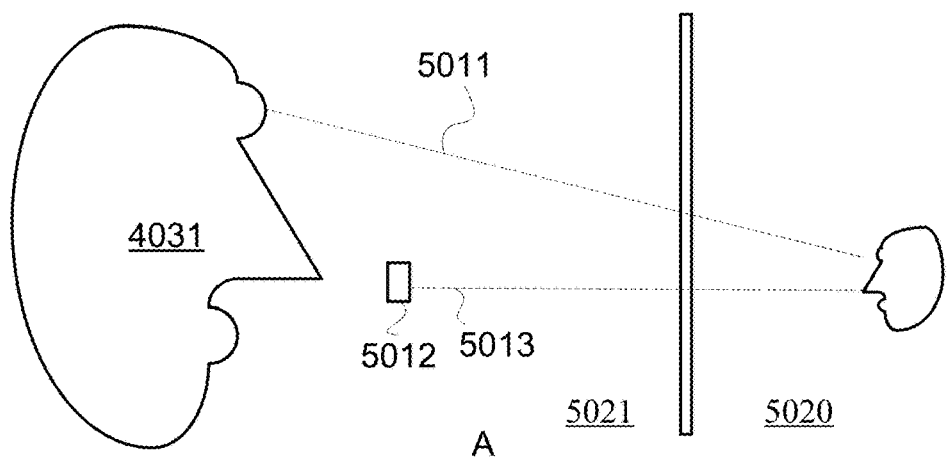
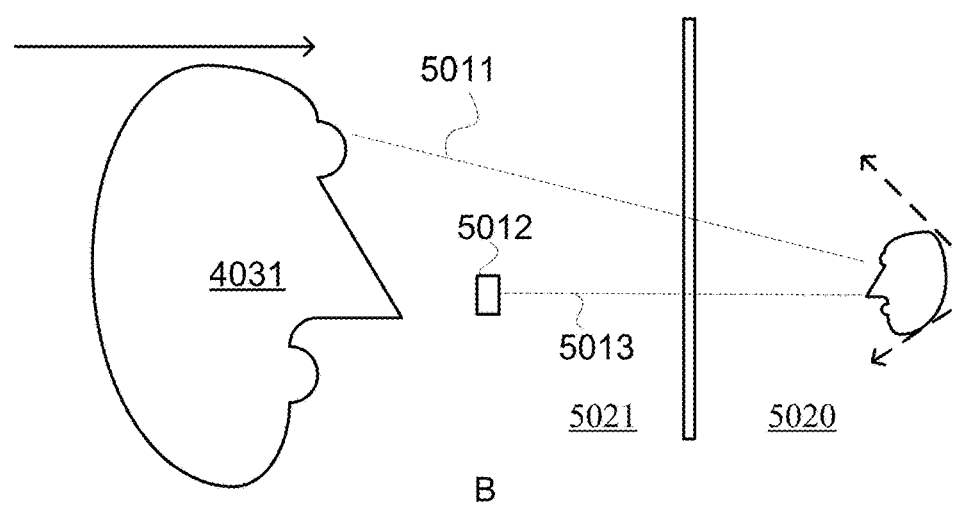
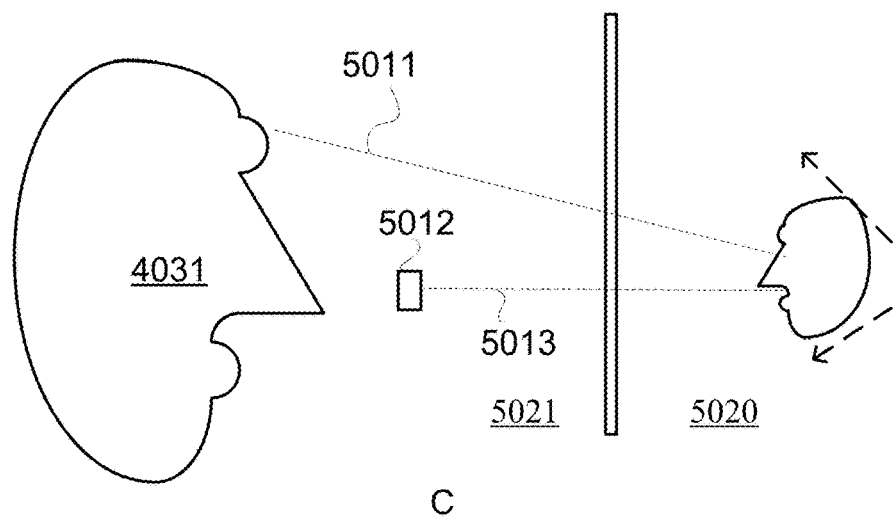
FIG. 15F

Sensing that a certain participant of a video conference changes his direction of gaze from a first virtual item to a second virtual item. 5410

Determining, by a machine learning process, at least one virtual movement of a certain participant avatar within the virtual environment that once applied shifts a direction of gaze within the virtual environment, of the certain participant avatar from the first virtual item to the second virtual item. The at least one virtual movement is selected out of (a) a virtual movement of eyes of the certain participant avatar, (b) a virtual movement of a torso of the certain participant avatar, (c) a virtual movement of a head of the certain participant avatar, or (d) a virtual movement of a body of the certain participant avatar. 5420

Responding to the determining. 5430

Sensing that a certain participant of a video conference changes his direction of gaze from a first virtual item to a second virtual item. 5410

Determining, by a machine learning process, at least one virtual movement of a certain participant avatar within the virtual environment that once applied shifts a direction of gaze within the virtual environment, of the certain participant avatar from the first virtual item to the second virtual item. The least one virtual movement may include at least one out of (a) a virtual movement of eyes of the certain participant avatar, or (b) one or more additional virtual movements that differ from the virtual movement of eyes of the certain participant avatar. 5460

Responding to the determining. 5470

GENERATING AN ALPHA CHANNEL

CROSS REFERENCE

This application claims priority from U.S. patent application Ser. No. 17/249,468 filing date Mar. 2, 2021, which claims priority from U.S. provisional patent Ser. No. 63/023,836 filing date May 12, 2020, from U.S. provisional patent Ser. No. 63/081,860 filing date Sep. 22, 2020, and from U.S. provisional patent Ser. No. 63/199,014 filing date Dec. 1, 2020, all being incorporated herein in their entirety.

This application claims priority from U.S. patent application Ser. No. 17/304,378 filing date Jun. 20, 2021, and from U.S. patent application Ser. No. 17/539,036 filing date Nov. 30, 2021, all being incorporated herein in their entirety.

BACKGROUND

Video conference calls are very popular. They require that each participant has their own computerized system with a camera that is usually located close to a display.

Typically, several participants in a meeting are presented in separate small tiles and another tile may be used for sharing one of the participants' screen.

Each participant is typically shown with the background of their own office or with a virtual background of their selection.

Participants are displayed from different angles and in different sizes.

As a result, people may feel disconnected and not as if they were all present in the same room.

As the user typically looks at the screen where the faces of the opposite person are displayed and not at the camera which may be above or below the screen, for example, the appearing image is of a person that is looking downwards or upwards respectively and not towards the other person. Hence, eye contact between the participants of the conversation is lost. This enhances the feeling of not being connected.

Furthermore, as on each participant's screen the other users' images may be located at different positions and in varying order, it is not clear who is looking at who.

Since all the audio streams from all the participants are merged into one single mono-track audio stream, it is impossible to know from what direction the sound arrives, and this may make it difficult to determine who is talking at any given moment.

As most webcams grab an image of the face from the middle of the chest and upwards, the participants' hands are frequently not shown and therefore hand gestures that are a significant part of normal conversations are not conveyed in a typical video conference.

Furthermore—the quality of traffic (bit rate, packet loss and latency) may change over time and the quality of the video conference calls may fluctuate accordingly.

Typically, video conferencing images tend to be blurry due to the limited resolution of the camera (1080×720 pixels in common laptop cameras), motion blur, and video compression. In many cases the video freezes and audio sounds metallic or is lost.

All these limitations cause an effect that is widely known as Zoom fatigue (https://hbr.org/2020/04/how-to-combat-zoom-fatigue) which results in participants becoming more tired after many hours of video conferencing meetings than they typically do in normal meetings in the same room.

There is a growing need to enhance the virtual interaction between participants and to overcome various other problems associated with current video conference call services.

SUMMARY

There may be provided a system, method and computer readable medium for generating an alpha channel.

BRIEF DESCRIPTION OF THE DRAWINGS

FIG. 1 illustrates an example of a method;
FIG. 4 illustrates an example of data structures;
FIG. 6 includes examples of methods;
FIG. 7 is an example of a panoramic view of a virtual 3D environment populated by five participants, a partial view of the some of the participants within the virtual 3D environment, and a hybrid view;
FIG. 8 illustrates two camera, fields of views of the two cameras, avatars and a displayed virtual 3D video conference environment (V3DVCE);
FIG. 9 illustrates two camera, fields of views of the two cameras, avatars and a displayed V3DVCE;
FIG. 15E illustrate a rotation from the initial relationship along the pitch axis;
FIG. 15F illustrates magnification changes;
FIG. 17C illustrates an example of a method;
and
FIG. 17D illustrates an example of a method.

DESCRIPTION OF THE DRAWINGS

Figure 2:
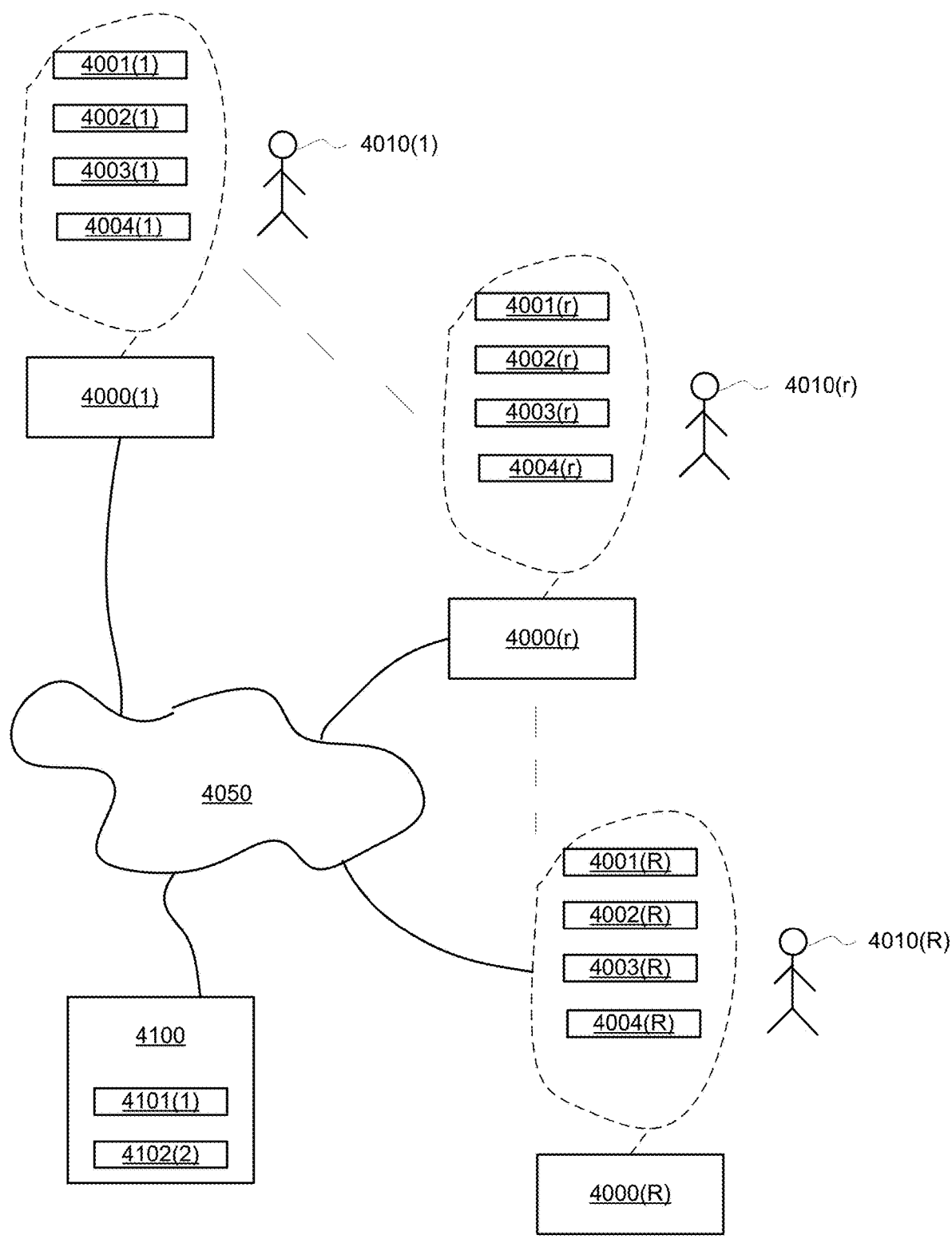
FIG. 2 illustrates an example of a computerized environment.

In the following detailed description, numerous specific details are set forth in order to provide a thorough understanding of the embodiments of the disclosure.

However, it will be understood by those skilled in the art that the present embodiments of the disclosure may be practiced without these specific details. In other instances, well-known methods, procedures, and components have not been described in detail so as not to obscure the present embodiments of the disclosure.

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the disclosure may for the most part, be implemented using electronic components and circuits known to those skilled in the art, details will not be explained in any greater extent than that considered necessary as illustrated above, for the understanding and appreciation of the underlying concepts of the present embodiments of the disclosure and in order not to obfuscate or distract from the teachings of the present embodiments of the disclosure.

Any reference in the specification to a method should be applied mutatis mutandis to a system capable of executing the method and should be applied mutatis mutandis to a computer readable medium that is non-transitory and stores instructions for executing the method.

Any reference in the specification to a system should be applied mutatis mutandis to a method that may be executed by the system and should be applied mutatis mutandis to a computer readable medium that is non-transitory and stores instructions executable by the system.

Any reference in the specification to a computer readable medium that is non-transitory should be applied mutatis mutandis to a method that may be applied when executing instructions stored in the computer readable medium and should be applied mutatis mutandis to a system configured to execute the instructions stored in the computer readable medium.

The term "and/or" means additionally or alternatively.

Any reference to a "user" should be applied mutatis mutandis to the term "participant"—and vice versa.

There is provided a method, a non-transitory computer readable medium and a system related to video and may, for example be applicable to 3D video conference calls. At least some of the examples and/or embodiments illustrated in the applications may be applied mutatis mutandis for other purposes and/or during other applications.

For example, referring to a 3D video conference that involves multiple participants. A first participant is imaged, and a second participant wishes to view a first avatar (or any other 3D visual representation) of the first participant within a virtual 3D video conference environment.

The generation of the first avatar (or any other 3D visual representation) may be executed in various manners—for example—only by a device of the second participant, only by the device of the first participant, partially by the device of the second participant, partially by the device of the first participant, by a cooperation between the devices of the first and second participants, by another computerized system (such as but not limited to a cloud system or a remote system), and/or any combination of one or more devices.

The inclusion of the avatar (or any other 3D visual representation) within the virtual 3D video conference environment may be executed in various manners—for example—only by a device of the second participant, only by the device of the first participant, partially by the device of the second participant, partially by the device of the first participant, by a cooperation between the devices of the first and second participants, by another device (such as but not limited to a cloud device or a remote device), and/or any combination of one or more devices.

Any reference to one manner of execution of any step of the generation of the first avatar and/or any reference to one manner of execution of any step of the inclusion of the avatar within the virtual 3D video conference environment may be applied mutatis mutandis to any other manner of execution.

The generation of the first avatar and/or the inclusion of the first avatar may be responsive to information gained by the device of the first user or to a camera or sensor associated with the device of the first user. A non-limiting example of information may include information regarding the first participant and/or information regarding to the acquisition of images of the first participant (for example camera setting, illumination and/or ambient conditions).

The system may include multiple user devices and/or intermediate devices such as servers, cloud computers, and the like.

FIG. 1 illustrates an example of method 200.

Method 200 is for conducting a three-dimensional video conference between multiple participants.

Method 200 may include steps 210, 220 and 230.

Step 210 may include receiving direction of gaze information regarding a direction of gaze of each participant within a representation of a virtual 3D video conference environment that is associated with the participant.

The representation of a virtual 3D video conference environment that is associated with the participant is a representation that is shown to the participant. Different participants may be associated with different representation of a virtual 3D video conference environment.

The direction of gaze information may represent a detected direction of gaze of the participant.

The direction of gaze information may represent an estimated direction of gaze of the participant.

Step 220 may include determining, for each participant, updated 3D participant representation information within the virtual 3D video conference environment, that reflects the direction of gaze of the participant. Step 220 may include estimating how the virtual 3D video conference environment will be seen from the direction of gaze of the participant.

Step 230 may include generating, for at least one participant, an updated representation of virtual 3D video conference environment, the updated representation of virtual 3D video conference environment represents the updated 3D participant representation information for at least some of the multiple participants. Step 230 may include rendering images of the virtual 3D video conference environment for at least some of the multiple participants. Alternatively—step 230 may include generating input information (such as 3D model and/or one or more texture maps) to be fed to a rendering process.

Method 200 may also include step 240 of displaying, by a device of a participant of the multiple participants, an updated representation of the virtual 3D video conference environment, the updated representation may be associated with the participant.

Method 200 may include step 250 of transmitting the updated representation of virtual 3D video conference environment to at least one device of at least one participant.

The multiple participants may be associated with multiple participant devices, wherein the receiving and determining may be executed by at least some of the multiple participant devices. Any step of method 200 may be executed by at least some of the multiple participant device or by another computerized system.

The multiple participants may be associated with multiple participant devices, wherein the receiving and determining may be executed by a computerized system that differs from any of the multiple participant devices.

Method 200 may include one of more additional steps—collectively denoted 290.

The one or more additional steps may include at least one out of:
- a. Determining a field of view of a third participant within the virtual 3D video conference environment.
- b. Setting a third updated representation of the virtual 3D video conference environment that may be sent to a third participant device to reflect the field of view of the third participant.
- c. Receiving initial 3D participant representation information for generating the 3D representation of the participant under different circumstances. The different circumstances may include at least one out of (a) different image acquisition conditions (different illumination and/or collection conditions), (b) different directions of gaze, (c) different expressions, and the like.
- d. Receiving in run time, circumstances metadata; and amending, in real time, the updated 3D participant representation information based on the circumstances metadata.
- e. Repetitively selecting for each participant, a selected 3D model out of multiple 3D models of the participant.
- f. Repetitively smoothing a transition from one selected 3D model of the participant to another 3D model of the participant.
- g. Selecting an output of at least one neural network of the multiple neural networks based on a required resolution.
- h. Receiving or generating participants appearance information about head poses and expressions of the participants.
- i. Determining the updated 3D participant representation information to reflect the participant appearance information.
- j. Determine a shape of each of the avatars that represent the participants.
- k. Determining relevancy of segments of updated 3D participant representation information.
- l. Selecting which segments to transmit, based on the relevancy and available resources.
- m. Generating a 3D model and one or more texture maps of 3D participant representation information of a participant.
- n. Estimating 3D participant representation information of one or more hidden areas of a face of a participant.
- o. Estimating 3D model hidden areas and one or more hidden parts texture maps.
- p. Determining a size of the avatar.
- q. Receiving audio information regarding audio from the participants and appearance information.
- r. Synchronizing between the audio and the 3D participant representation information.
- s. Estimating face expressions of the participants based on audio from the participants.
- t. Estimating movements of the participants.

The receiving of the 3D participant representation information may be done during an initialization step.

The initial 3D participant representation information may include an initial 3D model and one or more initial texture maps.

The 3D participant representation information may include a 3D model and one or more texture maps.

The 3D model may have separate parameters for shape, pose and expression.

Each of the one or more texture maps may be selected and/or augmented based on at least one out of shape, pose and expression.

Each of the one or more texture maps may be selected and/or augmented based on at least one out of shape, pose, expression and angular relationship between a face of the participant and an optical axis of a camera that captures an image of face of the participant.

The determining, for each participant, of the updated 3D participant representation information may include at least one of the following:
- a. Using one or more neural network for determining the updated 3D participant representation information.
- b. Using multiple neural networks for determining the updated 3D participant representation information, wherein different neural networks of the multiple neural networks may be associated with different circumstances.
- c. Using multiple neural networks for determining the updated 3D participant representation information, wherein different neural networks of the multiple neural networks may be associated with different resolutions.

The updated representation of the virtual 3D video conference environment may include an avatar per participant of the at least some of the multiple participants.

A direction of gaze of an avatar within the virtual 3D video conference environment may represent a spatial relationship between a (a) direction of gaze of a participant that may be represented by the avatar and (b) a representation of the virtual 3D video conference environment displayed to the participant.

The direction of gaze of an avatar within the virtual 3D video conference environment may be agnostic to an optical axis of a camera that captured a head of the participant.

An avatar of a participant within the updated representation of the virtual 3D video conference environment may appear in the updated representation of the virtual 3D video conference environment as being captured by a virtual camera located on a virtual plane that crosses the eyes of the first participant. Accordingly—the virtual camera and the eye may be located, for example at the same height.

The updated 3D participant representation information may be compressed.

The updated representation of the virtual 3D video conference environment may be compressed.

The generating of the 3D model and one or more texture maps may be based on images of the participant that were acquired under different circumstances.

The different circumstances may include different viewing directions of a camera that acquired the images, different poses, and different expressions of the participant.

The estimating of the 3D participant representation information of one or more hidden areas may be executed by using one or more generative adversarial networks.

The determining, for each participant, of the updated 3D participant representation information may include at least one out of:
a. Applying a super-resolution technique.
b. Applying noise removal.
c. Changing an illumination condition.
d. Adding or changing wearable item information.
e. adding or changing make up information.

The updated 3D participant representation information may be encrypted.

The updated representation of virtual 3D video conference environment may be encrypted.

The appearance information may be about head poses and expressions of the participants and/or be about lip movements of the participants.

The estimating face expressions of the participants based on audio from the participants may be executed by a neural network trained to map audio parameters to face expression parameters.

FIG. 2 illustrates an example of a computational environment that include users devices 4000(1)-4000(R) of users 4010(1)-4010(R). Index r ranges between 1 and R, R being a positive integer. The r'th user device 4000(r) may be any computerized device that may include one or more processing circuit 4001(r), a memory 4002(r), a man machine interface such as a display 4003(r), and one or more sensors such as camera 4004(r). The r'th user 4010(r) is associated with (uses) the r'th user device 4000(r). The camera may belong to the man machine interface.

The users devices 4000(1)-4000(R) and a remote computerized system 4100 may communicate over one or more networks such as network 4050. The one or more networks may be any type of networks—the Internet, a wired network, a wireless network, a local area network, a global network, and the like.

The remote computerized system may include one or more processing circuits 4101(1), a memory 4101(2), and may include any other component.

Any one of the users devices 4000(1)-4000(R) and a remote computerized system 4100 may participate in the execution of any method illustrated in the specification. Participate means executing at least one step of any of said methods.

Any processing circuit may be used—one or more network processors, non-neural network processors, rendering engines, image processors and the like.

One or more neural networks may be located at a user device, at multiple users devices, at a computerized system outside any of the user devices, and the like.

Figure 3:
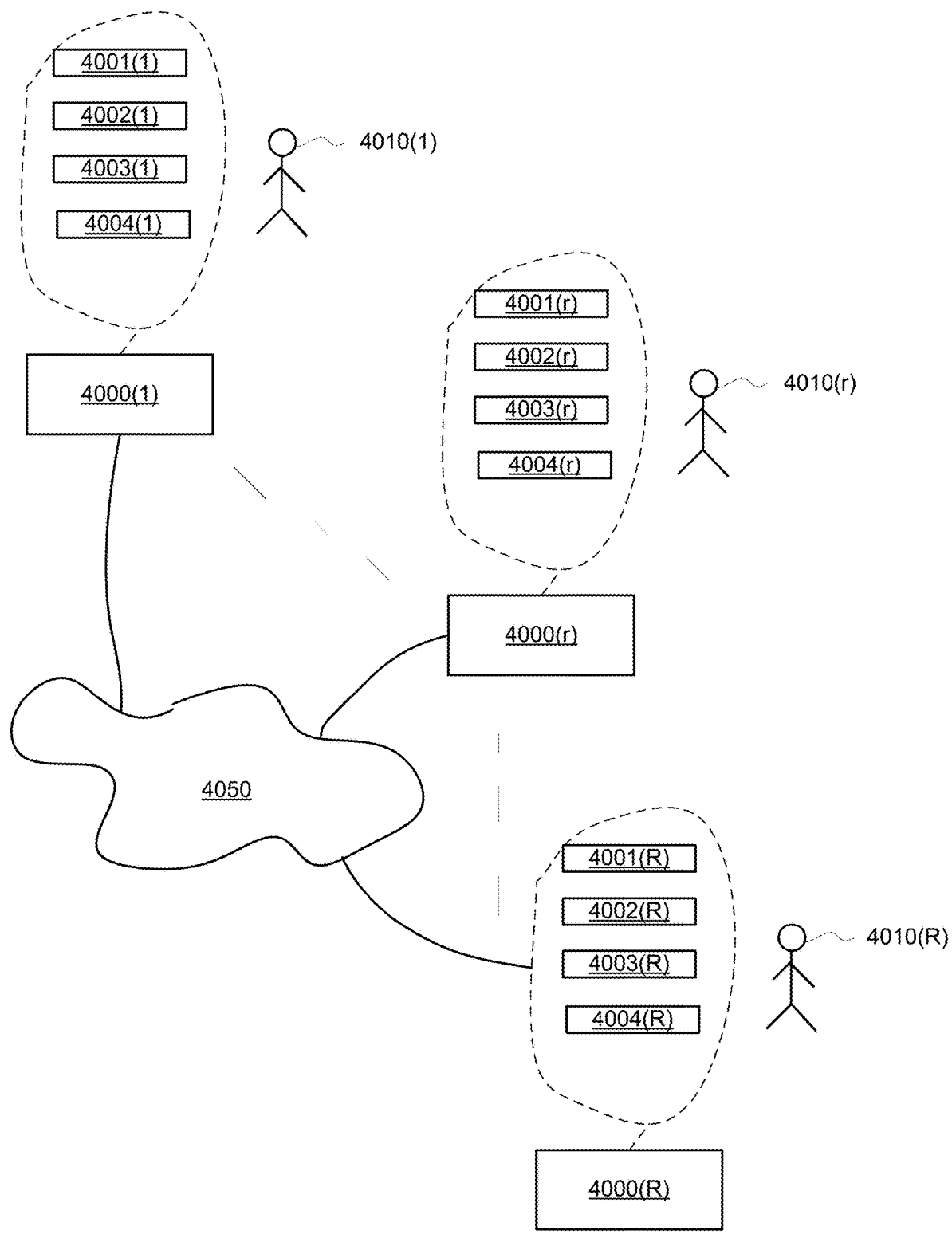
FIG. 3 illustrates an example of a computerized environment.

FIG. 3 illustrates an example of a computational environment that include users devices 4000(1)-4000(R) of users 4010(1)-4010(R). Index r ranges between 1 and R, R being a positive integer. The r'th user device 4000(r) may be any computerized device that may include one or more processing circuit 4001(r), a memory 4002(r), a man machine interface such as a display 4003(r), and one or more sensors such as camera 4004(r). The r'th user 4010(r) is associated with (uses) the r'th user device 4000(r).

The users devices 4000(1)-4000(R) may communicate over one or more networks such as network 4050.

Any one of the users devices 4000(1)-4000(R) may participate in the execution of any method illustrated in the specification. Participate means executing at least one step of any of said methods.

FIG. 4 illustrates an example of various data structures. The data structures may include user avatars 4101(1)-4101(j), texture maps 4102(1)-4102(k), 3D models 4103(1)-4103(m), 3D representations of objects 4104(1)-4104(n), and any mapping or other data structures mentioned in the application.

Any user may be associated with one or more data structure of any type—avatar, 3D model, texture map, and the like.

Some of the examples refer to a virtual 3D video conference environment such as a meeting room, restaurant, cafe, concert, party, external or imaginary environment in which the users are set. Each participant may choose or be otherwise associated with a virtual or actual background and/or may select or otherwise receive any virtual or actual background in which avatars related to at least some of the participants are displayed. The virtual 3D video conference environment may include one or more avatars that represents one or more of the participants. The one or more avatars may be virtually located within the virtual 3D video conference environment. One or more features of the virtual 3D video conference environment (that may or may not be related to the avatars) may differ from one participant to another.

Either the full body, the upper part of the body or just the face of the users are seen in this environment—thus an avatar may include full body of a participant, the upper part of a body of the participant body or just the face of the participant.

Within the virtual 3D video conference environment there may be provided an improved visual interaction between users that may emulate the visual interaction that exists between actual users that are actually positioned near each other. This may include creating or ceasing to have eye-contact, expressions directed at specific users and the like.

In a video conference call between different users, each user may be provided with a view of one or more other users—and the system may determine (based on gaze direction and the virtual environment)—where the user looks (for example at one of the other users—at none of the users, at a screen showing a presentation, at a whiteboard, etc.)—and this is reflected by the virtual representation (3D model) of the user within the virtual environment—so that other users may determine where the user is looking.

Figure 5:
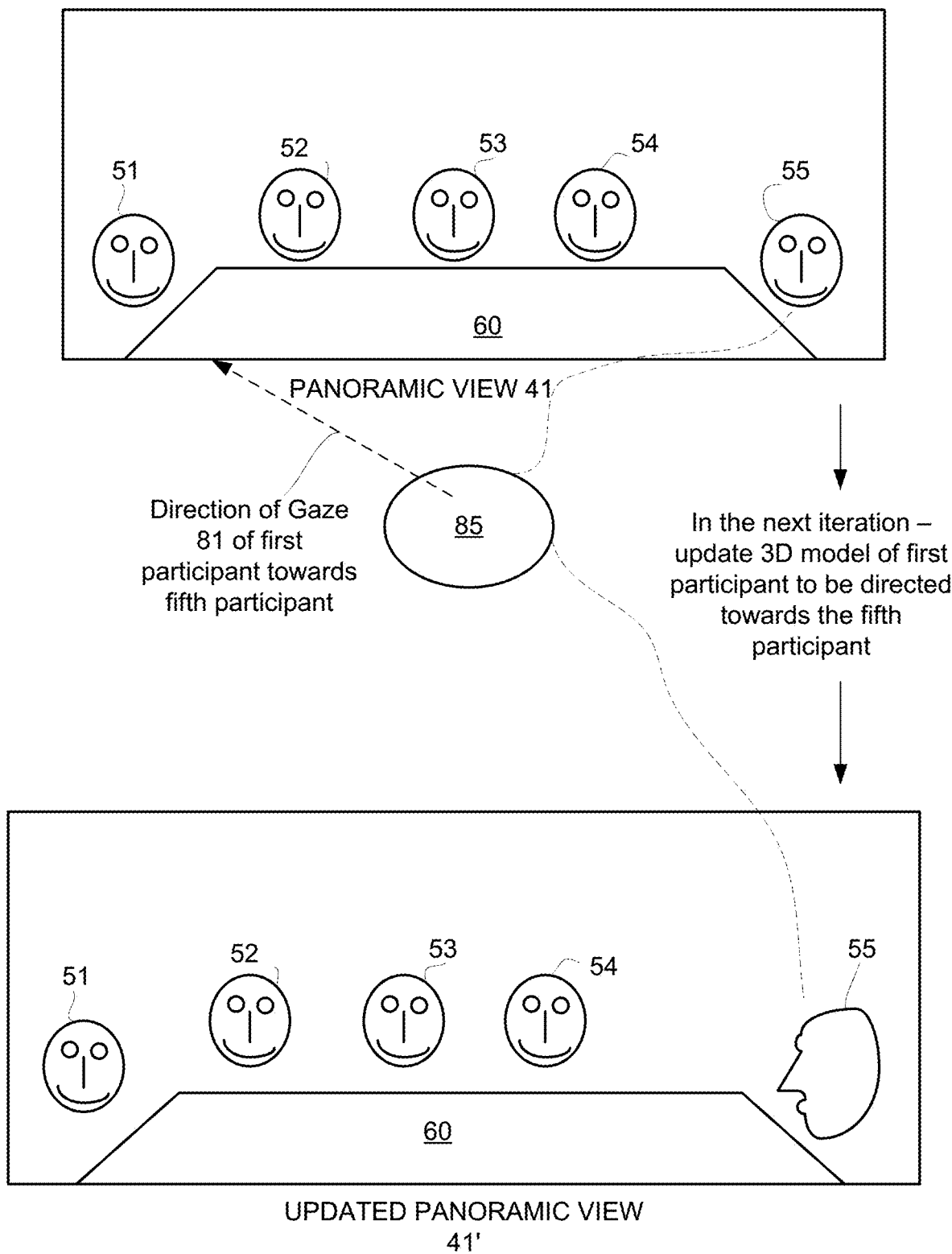
FIG. 5 illustrates an example of a process for amending a direction of view of a 3D model of a part of a participant according to a direction of gaze of the participant.

FIG. 5 illustrates an example of a process for amending a direction of view of an avatar of a part of a participant according to a direction of gaze of the participant. The upper part of FIG. 5 is a virtual 3D video conference environment—represented by a panoramic view 41 of five participants 51, 52, 53, 54 and 55 sitting near table 60. All participants face the same direction—the screen.

In the lower image the avatar of the fifth participant faces the avatar of first participant—as the fifth participant was detected to look at the 3D model of the first participant within the environment as presented to the fifth participant.

Tracking the user's eyes and gaze direction may also be used to determine the direction in which the user is looking (direction of gaze) and at which person or object the user is looking. This information can be used to rotate the avatar's head and eyes so that in the virtual space it also appears as if the user is looking at the same person or object as in the real world.

Tracking the user's head pose and eye gaze may also be used to control the virtual world's appearance on the user's screen. For example, if the user looks at the right side of the screen, the point of view of the virtual camera may move to the right, so that the person or object at which the user is looking is located at the center of the user's screen.

The rendering of a user's head, body, and hands from a certain point of view that is different than the original point of view of the camera may be done in different ways, as described below:

In one embodiment, a 3D model and texture maps are created before the beginning of the meeting and this model is then animated and rendered at run time according to the user's pose and expressions that are estimated from the video images.

A texture map is a 2D image in which each color pixel represents the red, green and blue reflectance coefficients of a certain area in the 3D model. An example of a texture map is shown in FIG. 20. Each color pixel in the texture map corresponds to certain coordinates within a specific polygon (e.g., triangle) on the surface of the 3D model.

Generally, each pixel in the texture map has an index of the triangle to which it is mapped and 3 coordinates defining its exact location within the triangle.

A 3D model composed of a fixed number of triangles and vertices may be deformed as the 3D model changes. For example, a 3D model of a face may be deformed as the face changes its expression. Nevertheless, the pixels in the texture map correspond to the same locations in the same triangles, even though the 3D locations of the triangles change as the expression of the face changes.

Texture maps may be constant or may vary as a function of time, expression or of viewing angle. In any case, the correspondence of a given pixel in a texture map and a certain coordinate in a certain triangle in the 3D model doesn't change.

In yet another embodiment, a new view is created based on a real-time image obtained from a video camera and the position of the new point of view (virtual camera).

In order to best match between the audio and the lip movement and facial expressions, the audio and video that is created from the rendering of the 3D models based on the pose and expressions parameters are synchronized. The synchronization may be done by packaging the 3D model parameters and the audio in one packet corresponding to the same time frame or by adding time stamps to each of the data sources.

To further improve the natural appearance of the rendered model, a neural network may be trained to estimate the facial expression coefficients based on the audio. This can be done by training the neural network using a database of videos of people talking and the corresponding audio of this speech. The videos may be of the participant that should be represented by an avatar or of other people. Given enough examples, the network learns the correspondence between the audio (i.e. phonemes) and the corresponding face movements, especially the lip movements. Such a trained network would enable to continuously render the facial expressions and specifically the lip movements even when the video quality is low or when part of the face is obstructed to the original video camera.

In yet another embodiment, a neural network can be trained to estimate the audio sound from the lip and throat movements or from any other facial cues, as is done by professional lip readers. This would enable to create or improve the quality of the audio when the audio is broken or when there are background noises that reduce its quality.

In yet another embodiment a neural network is trained to compress audio by finding a latent vector of parameters from which the audio can be reconstructed at a high quality. Such a network could serve to compress audio at a lower bit rate than possible with standard audio compression methods for a given audio quality or obtain a higher audio quality for a given bit rate.

Such a network may be trained to compress the audio signal to a fixed number of coefficients, subject to the speech being as similar as possible to the original speech under a certain cost function.

The transformation of the speech to a set of parameters may be a nonlinear function and not just a linear transformation as is common in standard speech compression algorithms. One example would be that the network would need to learn and define a set of basis vectors which form a spanning set of spoken audio.

The parameters then would be the vectorial coefficients of the audio as spanned by this set.

FIG. 6 illustrates method 2001.

Method 2001 is for conducting a 3D video conference between multiple participants, the method may include steps 2011 and 2021.

Step 2011 may include determining, for each participant, updated 3D participant representation information within the virtual 3D video conference environment, that represents participant. The determining may be based on audio generated by the participants and appearance information about appearance of the participants.

Step 2021 may include generating, for at least one participant, an updated representation of virtual 3D video conference environment, the updated representation of virtual 3D video conference environment represents the updated 3D participant representation information for at least some of the multiple participants. For example, any movement by the participant may expose or collude parts of the environment. Additionally, movements by participant may affect lighting in the room as the movements may modify the exposure to light of different parts of the environment.

The method may include matching between the audio from a certain participant and appearance information of a certain participant.

The appearance information may be about head poses and expressions of the participants.

The appearance information may be about lip movements of the participants.

Communications System Based on the 3D Models.

During the communication session, i.e., a 3D video conference call between several users, a 2D or 3D camera (or several cameras) grabs videos of the users. From these videos a 3D model (for example—the best fitting 3D model) of the user may be created at a high frequency, e.g., at a frame rate of 15 to 120 fps.

Temporal filters or temporal constraints in the neural network may be used to assure a smooth transition between the parameters of the model corresponding to the video frames in order to create a smooth temporal reconstruction and avoid jerkiness of the result.

The real-time parametric model together with the reflectance map and other maps may be used to render a visual representation of the face and body that may be very close to the original image of the face and body in the video.

Since this may be a parametric model, it may be represented by a small number of parameters. Typically, less than 300 parameters may be used to create a high-quality model of the face including each person's shape, expression and pose.

These parameters may be further compressed using quantization and entropy coding such as a Huffman or arithmetic coder.

The parameters may be ordered according to their importance and the number of parameters that may be transmitted and the number of bits per parameter may vary according to the available bandwidth.

In addition, instead of coding the parameters' values, the differences of these values between consecutive video frames may be coded.

The model's parameters may be transmitted to all other user devices directly or to a central server. This may save a lot of bandwidth as instead of sending the entire model of the actual high-quality image during the entire conference call—much fewer bits representing the parameters may be transmitted. This may also guarantee a high quality of the video conference call, even when the current available bandwidth may be low.

Transmitting the model parameters directly to the other users instead of via a central server may reduce the latency by about 50%.

The other user devices may reconstruct the appearance of the other users from the 3D model parameters and the corresponding reflectance maps. Since the reflectance maps, representing such things as a person's skin color change very slowly, they may be transmitted only once at the beginning of the session or at a low updating frequency according to changes that occur in these reflectance maps.

In addition, the reflectance maps and other maps may be updated only partially, e.g., according to the areas that have changed or according to semantic maps representing body parts. For example, the face may be updated but the hair or body that may be less important for reconstructing emotions may not be updated or may be updated at a lower frequency.

In some cases, the bandwidth available for transmission may be limited. Under such conditions, it may be useful to order the parameters to transmit according to some prioritization and then transmit the parameters in this order as the available bandwidth allows. This ordering may be done according to their contribution to the visual perception of a realistic video. For example, parameters related to the eyes and lips may have higher perceptual importance than those related to cheeks or hair. This approach would allow for a graceful degradation of the reconstructed video.

The model parameters, video pixels that may be not modelled and audio may be all synchronized.

As a result, the total bandwidth consumed by the transmission of the 3D model parameters may be several hundred bits per second and much lower than the 100 kbps-3 Mbps that may be typically used for video compression.

A parametric model of the user's speech may also be used to compress the user's speech beyond what may be possible with a generic speech compression method. This would further reduce the required bandwidth required for video and audio conferencing. For example, a neural network may be used to compress the speech into a limited set of parameters from which the speech can be reconstructed. The neural network is trained so that the resulting decompressed speech is closest to the original speech under a specific cost function. The neural network may be a nonlinear function, unlike linear transformations used in common speech compression algorithms.

The transmission of bits for reconstructing the video and audio at the receiving end may be prioritized so that the most important bits may be transmitted or receive a higher quality of service. This may include but may not be limited to prioritizing audio over video, prioritizing of the model parameters over texture maps, prioritizing certain areas of the body or face over others, such as prioritizing information relevant to the lips and eyes of the user.

An optimization method may determine the allocation of bitrate or quality of service to audio, 3D model parameters, texture maps or pixels or coefficients that may be not part of the model in order to ensure an overall optimal experience. For example, as the bitrate is reduced, the optimization algorithm may decide to reduce the resolution or update frequency of the 3D model and ensure a minimal quality of the audio signal.

The users may be provided with one or more views of the virtual 3D video conference environment—whereas the user may or may not select the field of view—for example, a field of view that includes all of the other users or only one or some of the users, and/or may select or may view one or some objects of the virtual 3D video conference environment such as TV screens, whiteboards, etc.

When combining the video pixels and the rendered 3D models, the areas corresponding to the model, the areas corresponding to the video pixels, or both may be processed so that the combination may appear natural and a seam between the different areas would not be apparent. This may include but may be not limited to relighting, blurring, sharpening, denoising or adding noise to one or some of the image components so that the whole image appears to originate from one source.

Each user may use a curved screen or a combination of physical screens to that the user in effect can see a panoramic image showing a 180 or 360 degree view (or any other angular range view) of the virtual 3D video conference environment and/or a narrow field of view image focusing on part of the virtual 3D video conference environment such as a few people, one person, only part of a person, i.e. the person's face, a screen or a whiteboard or any one or more parts of the virtual 3D video conference environment.

The user will be able to control the part or parts of the narrow field of view image or images by using a mouse, a keyboard, a touch pad or a joystick or any other device that allows to pan and zoom in or out of an image.

The user may be able to focus on a certain area in the virtual 3D video conference environment (for example a panoramic image of the virtual 3D video conference environment) by clicking on the appropriate part in the panoramic image.

FIG. 7 illustrates an example of a panoramic view 41 of the virtual 3D video conference environment populated by five participants and a partial view 42 of the some of the participants within the virtual 3D video conference environment. FIG. 7 also illustrates a hybrid view 43 that includes a panoramic view (or a partial view) and expanded images of faces of some of the participants.

The user may be able to pan or zoom using head, eyes, hands, or body gestures. For example, by looking at the right or left part of the screen, the focus area may move to the left or right, so it appears at the center of the screen, and by leaning forward or backwards the focus area may zoom in or out.

The 3D model of the person's body may also assist in correctly segmenting the body and the background. In addition to the model of the body, the segmentation method will learn what objects may be connected to the body, e.g., a person may be holding a phone, pen or paper in front of the camera. These objects will be segmented together with the person and added to the image in the virtual environment, either by using a model of that object or by transmitting the image of the object based on a pixel level representation. This may be in contrast to existing virtual background methods that may be employed in existing video conferencing solutions that may not show objects held by users as these objects are not segmented together with the person but rather as part of the background that has to be replaced by the virtual background.

Segmentation methods typically use some metric that needs to be exceeded in order for pixels to be considered as belonging to the same segment. However, the segmentation method may also use other approaches, such as Fuzzy Logic, where the segmentation method only outputs a probability that pixels belong to the same segment. If the method detects an area of pixels with a probability that makes it unclear if it and it is not sure whether the area should be segmented as part of the foreground or background, the user may be asked how to segment this area.

As part of the segmentation process, objects such as earphones, cables connected to the earphones, microphones, 3D glasses or VR headsets may be detected by a method. These objects may be removed in the modelling and rendering processes so that the image viewed by viewers does not include these objects. The option to show or eliminate such objects may be selected by users or may be determined in any other manner—for example based on selection previously made by the user, by other users, and the like.

If the method detects more than one person in the image, it may ask the user whether to include that person or people in the foreground and in the virtual 3D video conference environment or whether to segment them out of the image and outside of the virtual 3D video conference environment.

In addition to using the shape or geometrical features of objects in order to decide whether they may be part of the foreground or background, the method may also be assisted by knowledge about the temporal changes of the brightness and color of these objects. Objects that do not move or change have a higher probability of being part of the background, e.g., part of the room in which the user may be sitting, while areas where motion or temporal changes may be detected may be considered to have a higher probability of belonging to the foreground. For example, a standing lamp would not be seen as moving at all and it would be considered part of the background. A dog walking around the room would be in motion and considered part of the foreground, In some cases periodic repetitive changes or motion may be detected, for example where a fan rotates, and these areas may be considered to have a higher probability of belonging to the background.

The system will learn the preferences of the user and use the feedback regarding which objects, textures or pixels may be part of the foreground and which may be part of the background and use this knowledge in order to improve the segmentation process in the future. A learning method such as a Convolutional Neural Network or other machine learning method may learn what objects may be typically chosen by users as parts of the foreground and what objects may be typically chosen by users as part of the background and use this knowledge to improve the segmentation method.

The processing of this system may be performed on the user's device such as a computer, a phone or a tablet or on a remote computer such as a server on the cloud. The computations may also be divided and/or shared between the user's device and a remote computer, or they may be performed on the user's device for users with appropriate hardware and on the cloud (or in any other computation environment) for other users.

The estimation of the body and head parameters may be done based on compressed or uncompressed images. Specifically, they can be performed on compressed video on a remote computer such as a central computer on the cloud or another user's device. This would allow normal video conferencing systems to send compressed video to the cloud or another user's computer where all the modelling, rendering and processing would be performed.

Gaze Detection in Video Conferencing

Video conferencing is a leading method for executing meetings of all kinds. This is especially true with the globalization of working environments and has been enhanced with the appearance of the Covid-19 virus.

With the increase of importance of video conferencing systems, new methods of implementing them are being introduced. These include 3D environments, where the video conference appears to be held in a virtual setting. The participants also appear as 3D figures within the virtual environment, usually represented as avatars. In order for this kind of system to give participants a sensation of a real face-to-face meeting, it is important to understand where each participant is looking and to have the avatar look at the same place and with the same head orientation and movements as detailed below.

Prior art solutions are limited to understanding of where viewers look at the screen.

DOF—Degrees of Freedom
  6 DOF—relative to a coordinate system, a person's head can have 6 degrees of freedom. Three of these are the X, Y and Z location of a predefined point in the head (e.g., the tip of the nose or the right extreme point of one of the eyes, etc.) The other three degrees of freedom are rotations around these axes. These are often known as Pitch, Yaw and Roll.
  8 DOF—in addition to the 6 DOF, there are two additional degrees of freedom that help define a person's gaze. These additional degrees of freedom are necessary because the eyes do not necessarily look directly forward at all times.

Therefore, one needs to add two rotations of the eyes (Pitch and Yaw). In the most general case, one can say that each eye will have different values for these parameters.

Therefore, the most accurate description would actually be 10 DOF but for the sake of the document, only 8 DOF will be dealt with. In case a person looks at objects that are not in the immediate vicinity of the eyes, one can assume that both eyes have the same values for these parameters. The reduction from 10 DOF to 8 DOF can be done by averaging the values for both eyes or by taking the values of only one of the eyes. All that is written below can be applied to 10 DOF models.

There are known methods for determining where in the screen is the participant looking at. See for example http://developer.tobiipro.com/commonconcepts/calibration.html Solutions such as these only deal with understating at which point in the screen the viewer is looking. They are accomplished by calibrating the sight of the viewer as seen by the camera, with known coordinates of the screen.

Information about the screen size, or specifically the size of the window that is viewed by the viewer can be supplied by all operating systems or can be inferred by information about the screen size and window attributes within the screen.

In order to calculate the line of sight, one needs to find the 8 DOF parameters of the participant and combine that with the point on the screen with the participant is looking at.

The 6 DOF parameters can be obtained in the following manner: X and Y are relative to the camera's coordinates. Z can be obtained by one of the following methods:
  a. For calibration purposes, ask the participant to sit at a defined distance from the camera. This is a one-time process. Following this, Z can be calculated by changes in the size of the head as viewed by the camera.

b. Use a depth camera. These are more and more ubiquitous nowadays.
c. Infer the participant's distance from the camera by the size of the participant's head as captured by the camera and compared to an average human's head size. Average numbers can be obtained, for example, here: https://en.wikipedia.org/wiki/Human head
d. Assume that the participant is located at a certain distance from the camera (e.g., 55 cm)

The three additional DOF are then easily obtained. This involves finding the Euclidean matrix which describes the movement of the head and is well known in computer graphics and in other areas.

The additional DOF for the eyes can then be found by comparing the pupil locations relative to the center of the eyes.

In order to calculate the line of sight, one assumes a virtual pinhole camera (VCV) located at the geometrical point which is on the participant's face between the participant's eyes. A line is then calculated which joins that virtual camera with the point on the screen the viewer is looking at. Note that, since we are dealing with a virtual 3D video conferencing setting, this virtual camera is also used as a virtual camera (VCP) when deciding what to present to the viewer on the viewer's screen from within the 3D environment. Therefore, the line of sight is also the line of sight within the 3D environment. Under some circumstances and in order to reduce the amount of changes of what is presented to the viewer, VCP may be less prone to movements than VCV and may be located at a slightly different location. Even in these cases, the location of VCP is known and it is straightforward to translate the viewers line of sight from VCV coordinates to a line of sight in the VCP coordinates.

Finding the line of sight is followed by determining what is the viewer looking at. This can be answered by finding the opaque object along the line of sight which is closest to VCV along the line of sight. In order to reduce possible miscalculations, it may be possible to assume that the viewer is looking at a face along or closest to the line of sight.

FIG. 8 illustrates an example where the first and second cameras VCV 4421 and VCP 4422 are mutually aligned. VCV 4421 has an optical axis 4426 and a VCV field of view 4423. VCP 4422 has an optical axis 4427 and a VCP field of view 4424.

FIG. 8 also illustrates avatars 4401, 4402, 4403, 4404 and 4405 of five participants within the virtual 3D video conference environment (V3DVCE), the display 4425 (as virtually appears in the V3DVCE), and an image 4410 that illustrates the displayed representation of the V3DVCE in which the five avatars are illustrated.

FIG. 9 illustrates an example where the first and second cameras VCV 4421 and VCP 4422 are misaligned but have their optical axes and field of views spaced apart but parallel to each other.

Figure 10:
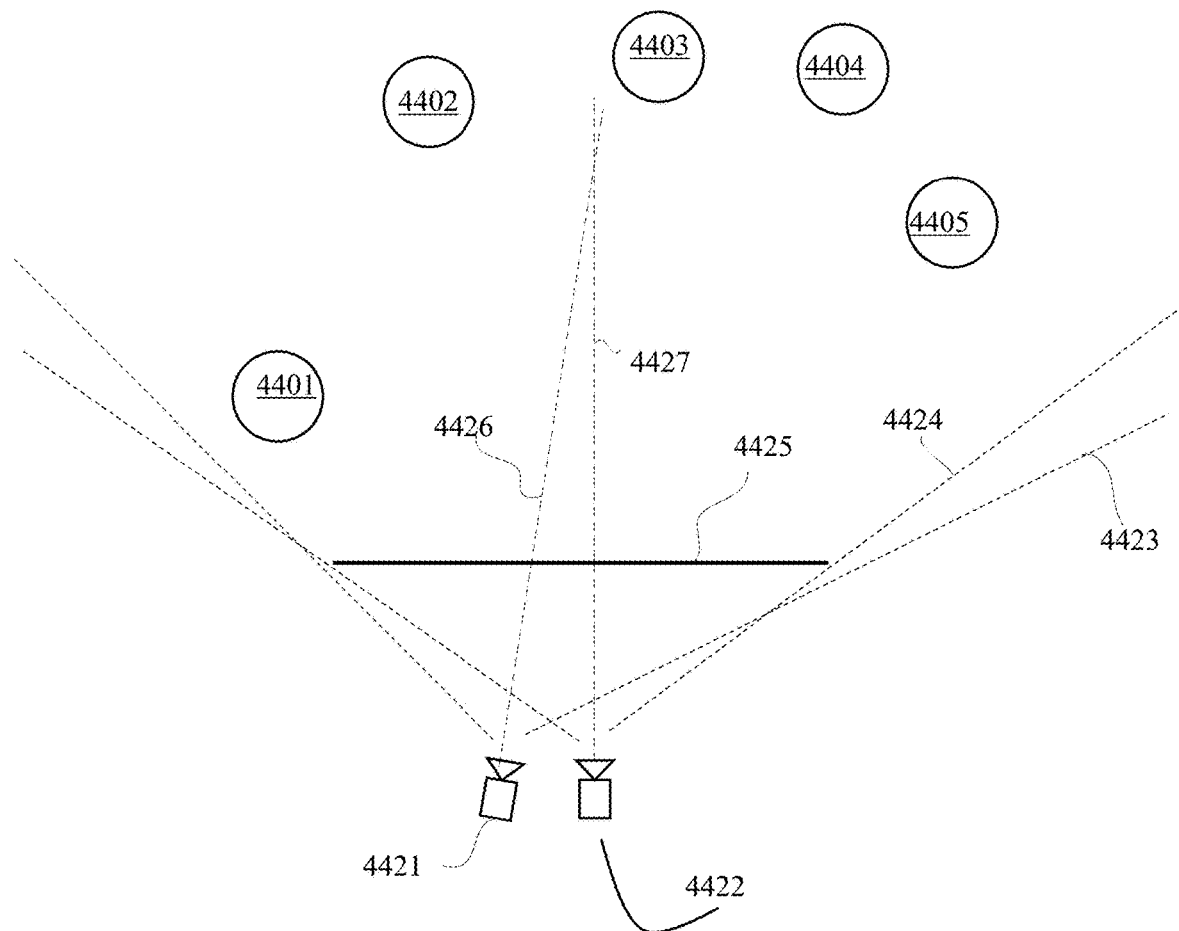
FIG. 10 illustrates two camera, fields of views of the two cameras, avatars and a displayed V3DVCE.

FIG. 10 illustrates an example where the first and second cameras VCV 4421 and VCP 4422 are misaligned but have their optical axes and field of views spaced apart and non-parallel to each other. Misalignment between the VCV and the VCP may occur. Misalignment between them may mean that the optical axis of the VCV is misaligned with the optical axis of the VCP. When this occurs, a gaze related object (or a part of said gaze related object) that can be fully seen by one camera, may be at least partially concealed from the other camera.

Figure 11:
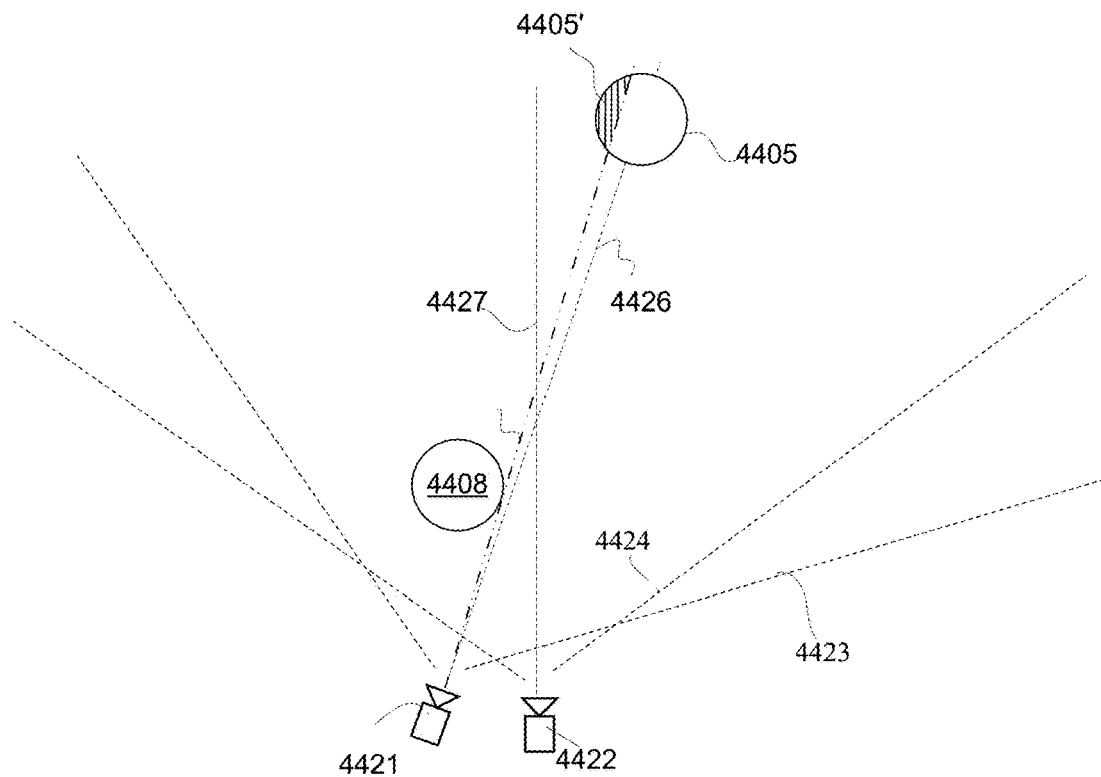
FIG. 11 illustrates two camera, fields of views of the two cameras, avatars and a displayed V3DVCE.

FIG. 11 illustrates an example where the first and second cameras VCV 4421 and VCP 4422 are misaligned, their optical axes and field of views spaced apart and non-parallel to each other, an avatar 4405 (example of a gaze related object) is fully seen by VCP 4422 and is partially concealed (part 4405' is not shown)—due to the presence of another gaze related object 4408.

Figure 12:
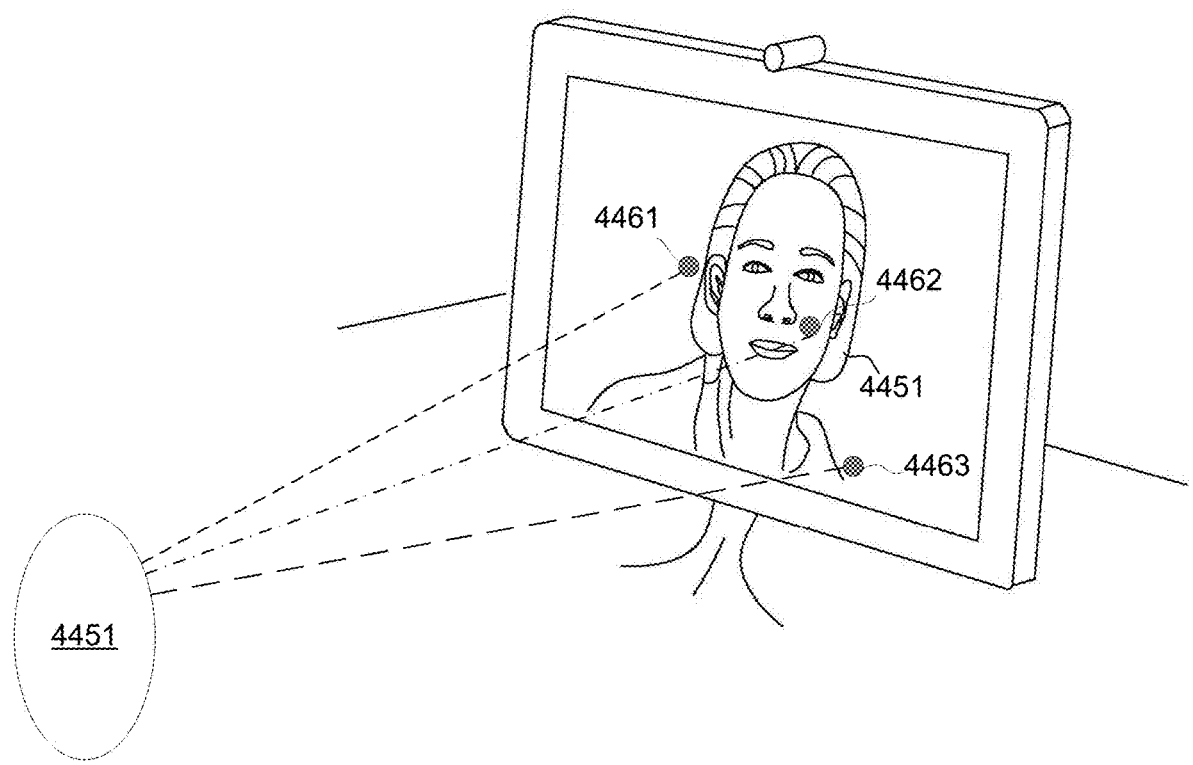
FIG. 12 illustrates a participant and an avatar.

FIG. 12 illustrates a participant 4451 that looks at three different points of time, at points 4461, 4462 and 4463 within the V3DVCE, point 4464 is positioned on the face of avatar 4451, points 4461 and 4463 are located in proximity to avatar 4451—and the method may conclude that the participant looks at the avatar 4451.

Figure 13:
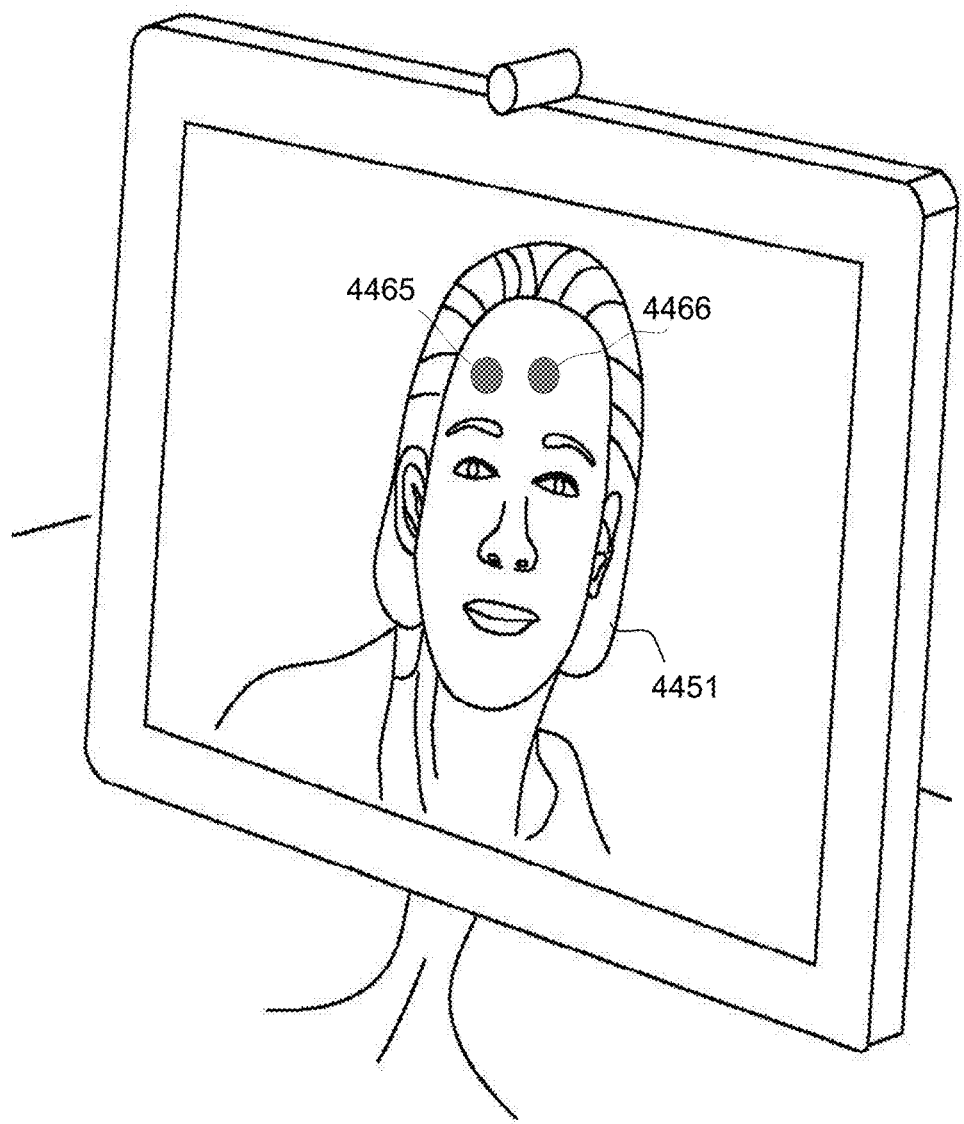
FIG. 13 illustrates points of gaze of a participant and an avatar.

FIG. 13 illustrates different points of gaze of a participant (appearing as points 4465 and 4465 on an avatar 4451 of another participant. The participant has its gaze oscillate between points 4465 and 4466 (on avatar 4451). By applying a temporal filter and/or smoothing—the gaze may be set (for purposes of generating the next displayed version of the V3DVCE) on one point—being one of the points, average point between points 4465 and 4466.

Figure 14:
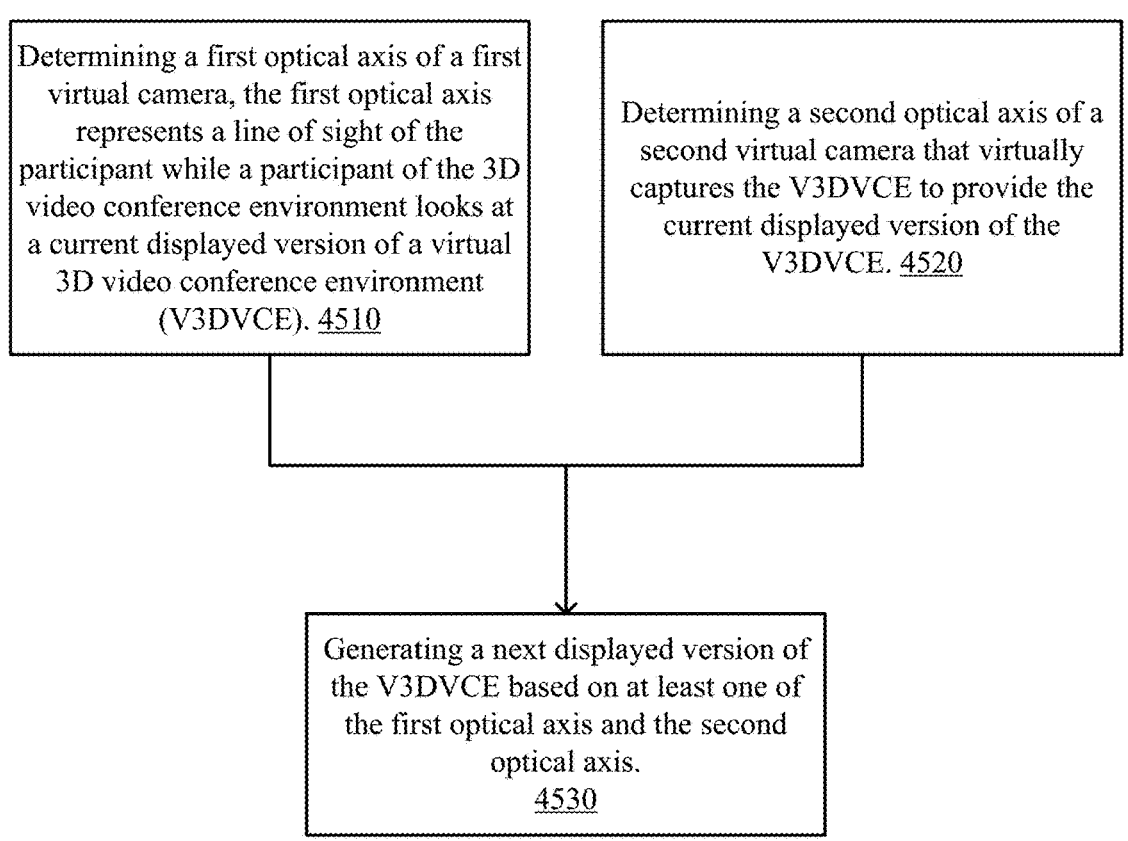
FIG. 14 illustrates an example of a method.

FIG. 14 illustrates method 4500 for virtual 3D video conference environment generation.

Method 4500 may start by steps 4510 and 4520.

Step 4510 may include determining a first optical axis of a first virtual camera, the first optical axis represents a line of sight of the participant while a participant of the 3D video conference environment looks at a current displayed version of a virtual 3D video conference environment (V3DVCE). A current displayed version of the V3DVCE is displayed on a display.

The first virtual camera may be virtually positioned at a geometrical point between both eyes of a participant and on a face of the participant.

Step 4510 may include at least one out of:
a. Applying a temporal filter on multiple intermediate determinations of the first optical axis, made during a certain time period.
b. Applying a smoothing operation on multiple intermediate determinations of the first optical axis, made during a certain time period.
c. Applying a temporal filter on multiple intermediate determinations of a second optical axis, made during the certain time period.

Step 4520 may include determining a second optical axis of a second virtual camera that virtually captures the V3DVCE to provide the current displayed version of the V3DVCE.

The V3DVCE may be displayed in correspondence to the second optical axis.

Steps 4510 and 4520 may be followed by step 4530 of generating a next displayed version of the V3DVCE based on at least one of the first optical axis and the second optical axis.

Steps 4510, 4520 and 4530 may be repeated multiple times—for example during the duration of the 3D video conference. Steps 4510, 4520, 4530 may be repeated each video frame, each multiple video frames, one to tens frames per second, once per second, once per multiple seconds, and the like.

Step 4530 may include at least one out of:
a. Comparing the second optical axis to the estimate of the line of sight of the participant within V3DVCE. The line of sight may have a first part outside the display.
b. The comparing may include calculating an estimate of the second optical axis outside the display.

c. Comparing the line of sight to the estimate of the second optical axis outside the display.
d. Determining an intersection pixel of the display that intersects with the first optical axis.
e. Searching for a potential object of interest that is virtually positioned within the V3DVCE in proximity to the line of sight within the V3DVCE, and determining a content of the next displayed version based on the potential object of interest. The potential object of interest may include an avatar. The potential object of interest may not be intersected by the line of sight.
f. Virtually amending the line of sight to virtually intersect with the potential object of interest.
g. Determining one or more gaze related objects. A gaze related object is an object that is located within a field of view of the participant, as represented by the direction of gaze of the participant.
h. Determining whether a gaze related object of the one or more gaze related objects at least partially conceals another gaze related object of the one or more gaze related objects. There may be an angular difference between the first optical axis and the second optical axis. The estimate of the first optical axis in the V3DVCE is an angular difference compensated estimate of the line of sight within the V3DVCE. Step 4530 may include compensating for an angular difference between the first optical axis and the second optical axis The one or more gaze related objects may include:
a. At least one object that intersects with the estimate of the first optical axis in the V3DVCE.
b. At least one object that is a face of an avatar of a participant that is located in proximity to the estimate of the first optical axis in the V3DVCE.
c. At least one object of interest within in the V3DVCE.

In the foregoing specification, the embodiments of the disclosure have been described with reference to specific examples of embodiments of the disclosure. It will, however, be evident that various modifications and changes may be made therein without departing from the broader spirit and scope of the embodiments of the disclosure as set forth in the appended claims.

Unconscious Gesture Control for Virtual Video Conferencing Environments

Participants in virtual video conferences typically sit in front of a screen (display) or multiple screens and view a virtual environment such as the V3DVCE. Within the virtual environment the participant can see the other participants as if they are co-located in one virtual location.

Similarly, any other participant can see this first participant as co-located with the other participants in the virtual environment.

So, if, for example, there are six participants in the video conference, each one of them sees the other five as being co-located. Each of the participants is viewed by a camera (or more than one camera) which is connected to the virtual video conference system. The system analyses the viewers' gaze, motions and gestures and reflects them on to the participants respective avatars.

Each viewer sees the virtual environment as it would be viewed by a virtual camera located within the virtual environment. In practice, such a camera does not exist (as doesn't the virtual location) and is in fact an animated reproduction of what would have been viewed by such a camera if it had existed in the virtual environment.

Looking at the virtual conference through multiple screens is the equivalent of looking at it through one large screen and therefore, throughout this patent application, only one screen is described.

Looking at any location through one screen may in many ways be thought to be similar to looking at the location through a window. Regardless of the question if some zooming in or zooming out is involved, the virtual environment as displayed on the screen is limited by the screen size and will never be able to show concurrently the full virtual environment. Therefore, the viewing participant watching the screen has a limited view of the conference environment.

The virtual video conference environment can detect the viewer's view and change the display accordingly.

It is most natural for people looking at screens to have their gaze directed on average to about the center of the screen. Indeed, viewers would typically look at many different points on the display, but it is most comfortable to have the center of attention located at or close to the center of the display.

For example—assuming a V3DVCE that illustrates multiple avatars that represents different participants of the 3D video conference. One participant (represented by an avatar within the V3DVCE) is attracting a lot of attention. For example, assume that this participant is now presenting or talking to the other participants.

Furthermore, let us assume that this participant appears on the left side (far from the center) of the display of the viewer. The viewer would typically spend a long time gazing at the left side of the screen. As mentioned above, a camera viewing the viewer analyses and detects the viewer's gaze.

The system can, in this example, detect that the viewer's gaze is constantly located at the left side of the display. It will then adjust the display as if the virtual camera slowly pans to the left so that eventually, the viewer's gaze is at the center of the screen.

Changing the settings of the virtual camera may include pan (left-right), tilt (up-down) and zoom (in-out) based on the gaze of the viewer. The change in settings may depend on the following factors:
a. How long the viewer gazed at a specific area in the display. This may reflect constant viewing or average over time.
b. Adjusting the settings may be performed at a speed which allows for non-abrupt changes. There may be some sort of hysteresis involved in deciding whether to adjust the settings or not.
c. The speed of adjusting the settings may depend on previous adjustments. For example, if the virtual camera had already panned much to one side, then adding panning to that side would be at a slower pace.

The settings may have different maximum values allocated to them. For example, not to pan beyond a certain angle compared to some initial setting. Similarly, zooming in may by limited to some value.

In this manner, adjusting the settings of the virtual camera (and therefore the display as seen by the viewer) corresponds to the viewer's gaze and should be considered unconscious as the gaze reflects a gesture performed naturally and without a specific intent to affect the system.

Figure 15A:
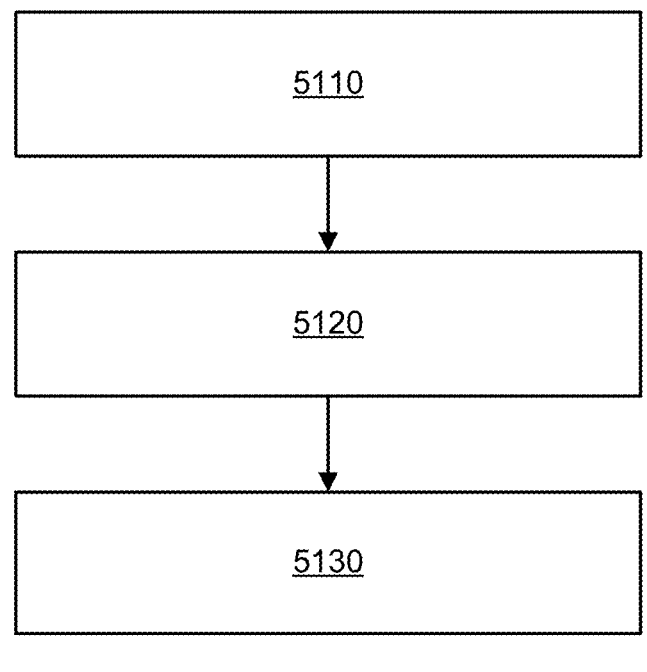
FIG. 15A illustrates an example of a method.

FIG. 15A illustrates a method 5100 for video conference environment generation.

Method 5100 may start by initialization step 5110.

Step 5110 may include obtaining one or more mappings between participant gaze patterns and suggested changes in one or more display parameters of a virtual 3D video conference environment (V3DVCE).

Step 5110 may be followed by step 5120 of detecting a participant gaze pattern in relation to a display that displays a version of the V3DVCE.

The detecting may be executed during a period of time and the detected participant gaze pattern may be limited to what happened during the period of time—but may include an estimate or prediction of the participant gaze pattern after the completion of the period of time.

The detecting may be model-based, machine learning based, and the like.

A model-based detection can include generating a model of the participant gaze pattern.

Additionally or alternatively, the model-based detection may include searching a reference model that fits sensed participant gaze information. A fitting model may match the sensed participant gaze information, may be the best matching participant gaze information, may be a model that estimates the actual gaze pattern with a tolerable accuracy, and the like.

The model may be generated by a machine learning process, or by a process other than a machine learning process, and the like.

A model may be provided per a specific participant, per a group of persons (may be the participants but may be any other group of persons from which a model can be built), and the like.

Step 5120 may be followed by step 5130 of changing, without an explicit request from the participant, one or more display parameters of the V3DVCE to induce a change of at least one participant gaze pattern parameter.

Assuming that the participant gaze pattern provides information even after the completion of step 5120—and even during step 5130—the changing should take into account the gaze pattern during the changing and even after the changing.

For example—a gradual rotation of the V3DVCE may be applied in order to position an item of interest within a predefined location of the screen. If the user dramatically changes his point of view during the gradual rotation—then a continuation of the gradual rotation relevancy may be evaluated.

Step 5130 may include rotating the V3DVCE. Additionally or alternatively, step 5130 may include changing a magnification factor (zoom in or zoom out) of the V3DVCE or of any part of the VVCR.

The virtually rotating may include changing a yaw angle of the V3DVCE.

The virtually rotating may include changing a pitch angle of the V3DVCE.

The changing may include inducing the participant to look at a center region of the display.

The changing may include inducing the participant to look at an out-of-center region that differs from the center region. The out-of-center region may be closer to the center of the screen than the location of the item of interest before executing step 5310.

For example, assuming that the field of view along a horizontal axis ranges between plus and minus 30 degrees. The center of the screen may range, for example between plus and minus 5 degrees. Assuming that the item of interest is located at an angle of about 25 degrees—the out-of-center region may be located anywhere between 6 and 24 degrees—especially 10 and 20 degrees.

While the mentioned above example refers to cantering the point of gaze of the user—other changes may be introduced—for example—if the user looked to a certain side of the display during a predefined period (for example 0.5, 1, 5, 10, 15 minutes)—the changing may include inducing the user to look to the other side of the display. This may include causing the user to look at an item that will be located (after rotating the V3DVCE) to another side of the display.

Yet for another example there may be provided a changing that may reverse the side of the displayed item of interest and also center the displayed item.

Assuming the same field of view and center region—and that the item of interest is located at an angle of about 25 degrees—then the V3DVCE may be rotated to locate the item of interest at an angle of about −25 degrees—or the V3DVCE may be rotated to locate the item of interest at an out-of-center region that may be located anywhere between −6 and −24 degrees—especially −10 and −20 degrees.

The participant gaze pattern may be indicative of an item of interest within the V3DVCE. Step 5130 may include changing of the one or more display parameters of the V3DVCE by positioning the item of interest within a center region of the display. Step 5130 may include changing of the one or more display parameters of the V3DVCE at a change rate that is lower than a predefined value.

The predefined value for change rate may range between 1-1000 milliseconds, between 0.1-100 milliseconds, and the like. For example—the predefined value may be 5, 10, 15, 20, 25, 30, 35, 40, 45, 50, 55, 60, 65, 70, 75, 80, 85, 90, 95, 100, 105,
110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, 200, 305, 310, 315, 320, 325, 330, 335, 340, 345, 350, 355, 360, 365, 370, 375, 380, 385, 390, 395 milliseconds—and even exceed 400 milliseconds.

A higher change rate can make the changing less prominent and may attract less attention from the user.

A lower change rate increases the chances that a desired change of the gaze pattern of the user is completed—before that uses changes his actual direction of gaze. For example—if a goad of step 5130 is to position the item of interest at a certain location (for example at the center of the display—or at a certain distance from the center—then the goal will have higher chances to be fulfilled with higher change rates.

The change rate may be amended based on feedback from the user—for example based on requests to speed the change rate or slow the change rate.

The change rate may be a function of a participant gaze pattern of a user—for example the amount of time spent on each segment of the displayed image—longer periods of looking at a certain point may allow to lower the change rate.

Method 5100 may also include obtaining audio direction information regarding audio generated during at least a part of the video conference. This may include detecting that a certain participant (represented by an avatar) talked—and defining that participant as an item of interest. This may cause to rotate the direction of gaze towards that avatar.

Thus—step 5130 may include changing of the one or more display parameters of the V3DVCE by also being responsive to the obtaining audio direction information.

Figure 15B:
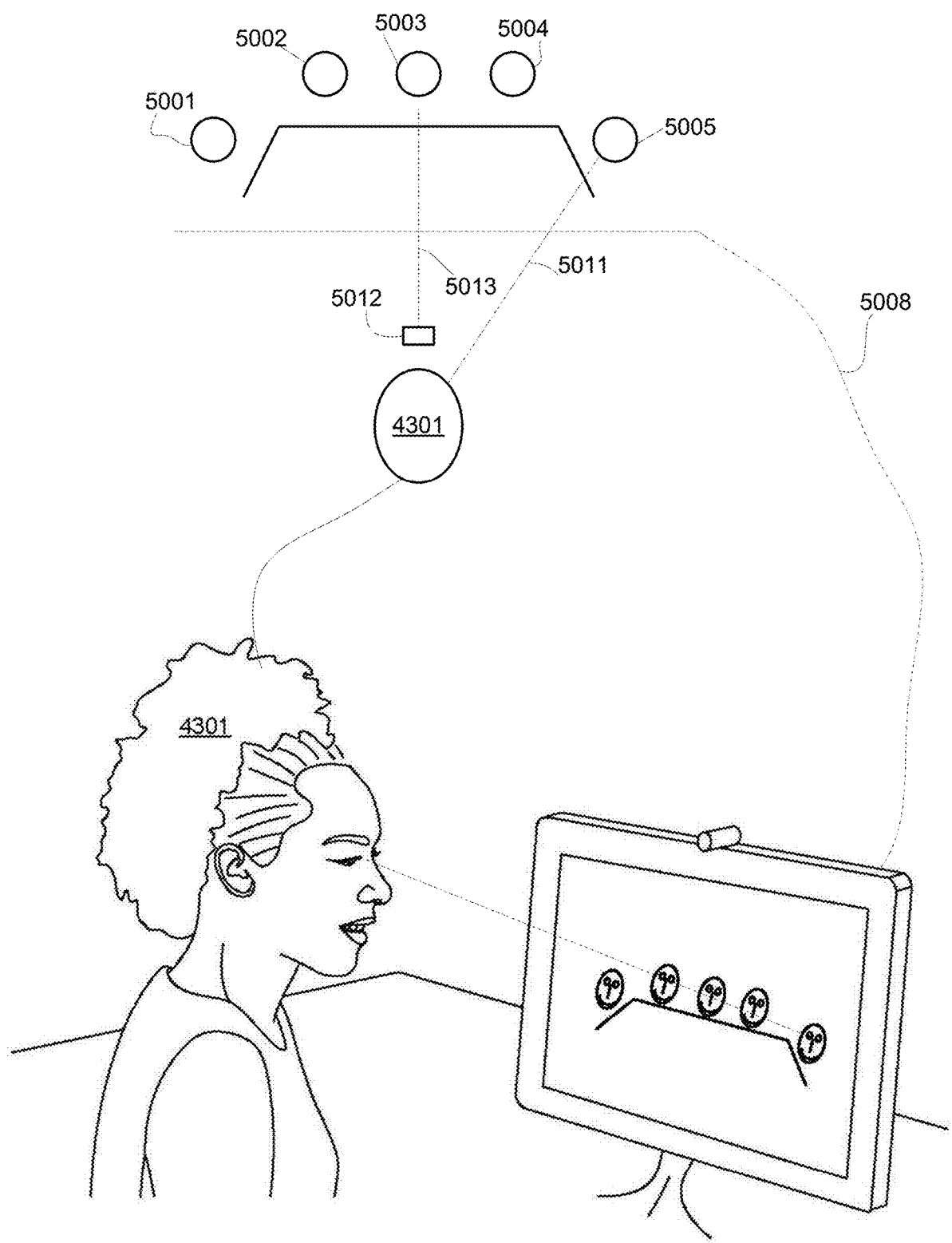
FIG. 15B illustrates an example of a participant that watches a V3DVCE displayed on a display.

FIG. 15B illustrates a participant 4301 that watches a V3DVCE displayed on display 5008. The V3DVCE illustrates five avatars 5001-5005 that are seated near a table. FIG. 15B also illustrates a virtual top view of the display 5008 and the V3DVCE.

The participant 4301 looks at avatar 5005 that is located to the right of the display and her direction of gaze is denoted 5011.

FIG. 15B also illustrates a virtual camera (VCP) 5012 having am optical axis 5013 that represents the angle of display of the V3DVCE.

Figure 15C:
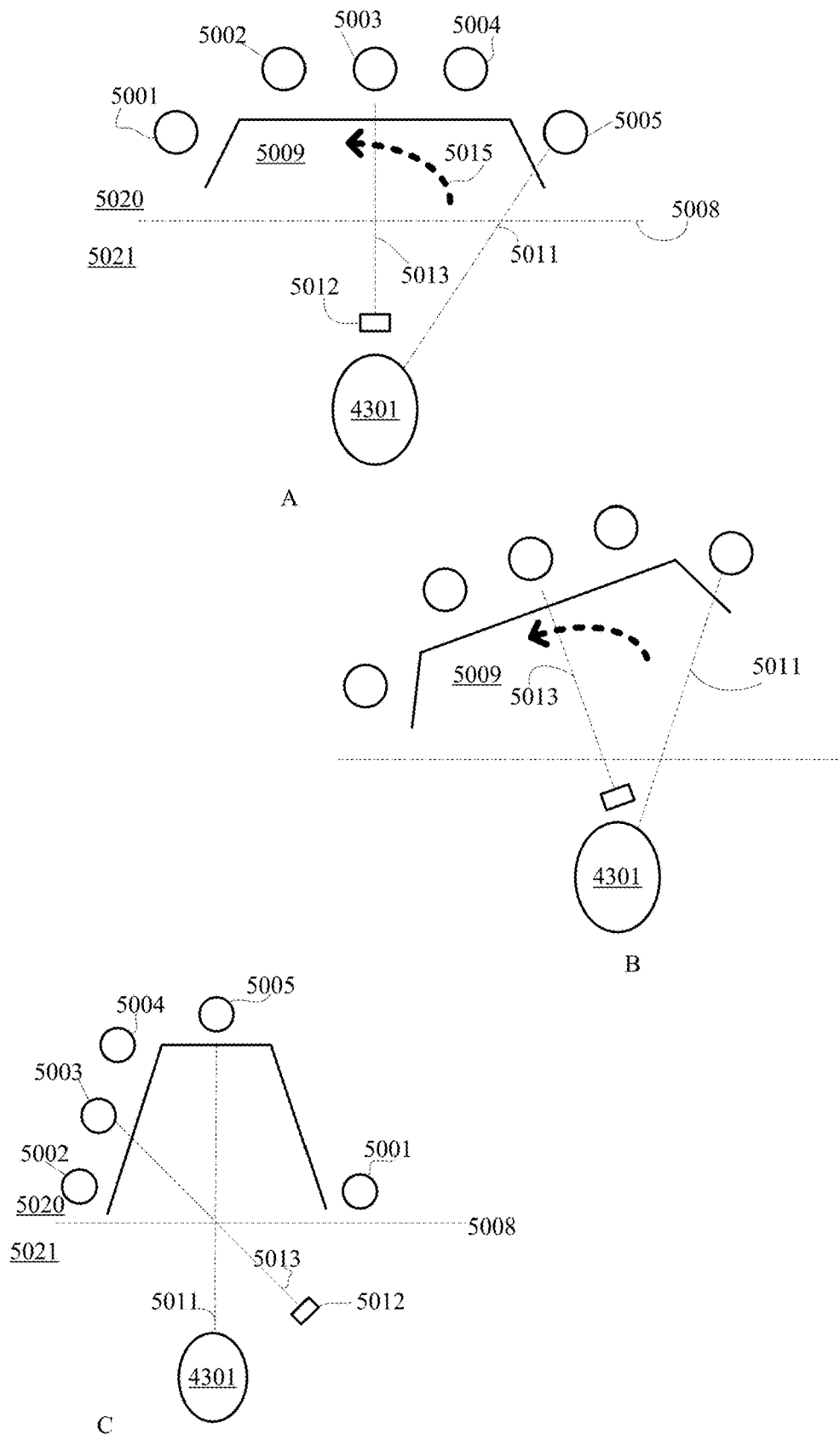
FIG. 15C illustrates rotational movements of the V3DVCE.

FIG. 15C illustrates (part A) the participant 4301 that watches a V3DVCE displayed on display 5008—especially gazes towards avatar 5005, and also illustrates five avatars 5001-5005 that are virtually seated near a table. Arrow 5015 indicates that the method 5100 decided to rotate the V3DVCE counter clockwise so that the avatar will be either closer to the center region (part B) or be located at the center region of the display (part C). The rotation may end at part B or may end at part C.

FIGS. 15B and 15C illustrate changes in a yaw angle. It should be noted that changes may applied, additionally or alternatively to a pitch axis.

Changes may be applied along any combination of any rotational axes—for example yaw axis and pitch axis.

Figure 15D:
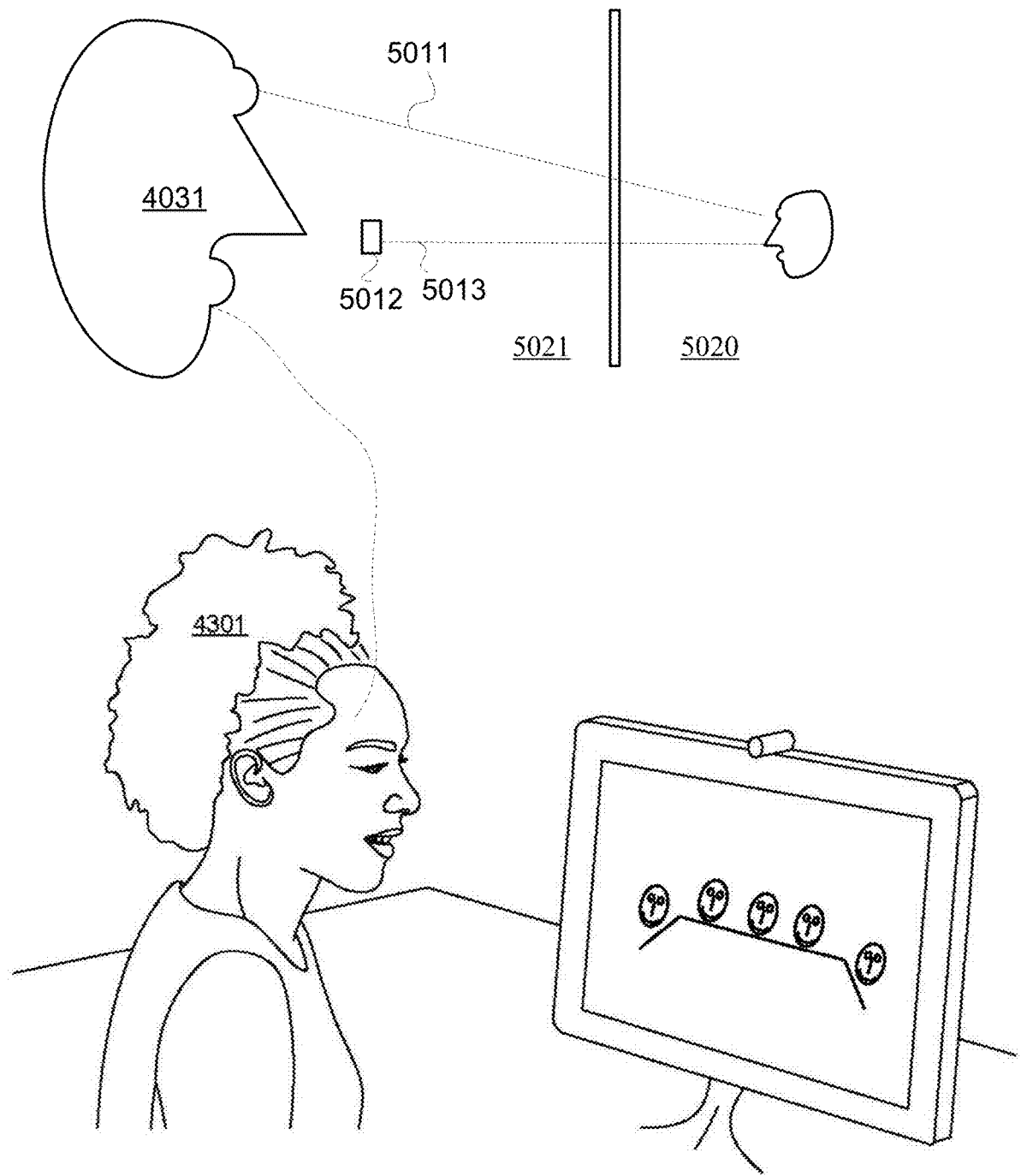
FIG. 15D illustrates an initial relationship between a participant and an avatar.

FIG. 15D illustrates an initial relationship between the participant and an avatar while FIG. 15E illustrates a rotation from the initial relationship along the pitch axis.

While FIGS. 15B-15D discloses rotational movements of the V3DVCE—it should be noted that changes in the magnification of the V3DVCE (or parts of the V3DVCE) may be provided—and that movements of the participant (not commands or predefined command gestures made by the participant)—indicative of the need of zoom-in (for example a movement of the head of the participant towards the display) or zoom-out (for example a movement of the user away from the display)—may trigger a change in the magnification of the V3DVCE.

FIG. 15F illustrates (part A) an initial position of the participant 4031 within the real world 5021—the participant looks at a certain avatar within the virtual world. Part B of FIG. 15F illustrates the participant after moving towards the display (indicative of a need to zoom in). This is followed by magnification of the V3DVCE—as can be seen from the enlarged avatar of part C of FIG. 15F.

Figure 15G:
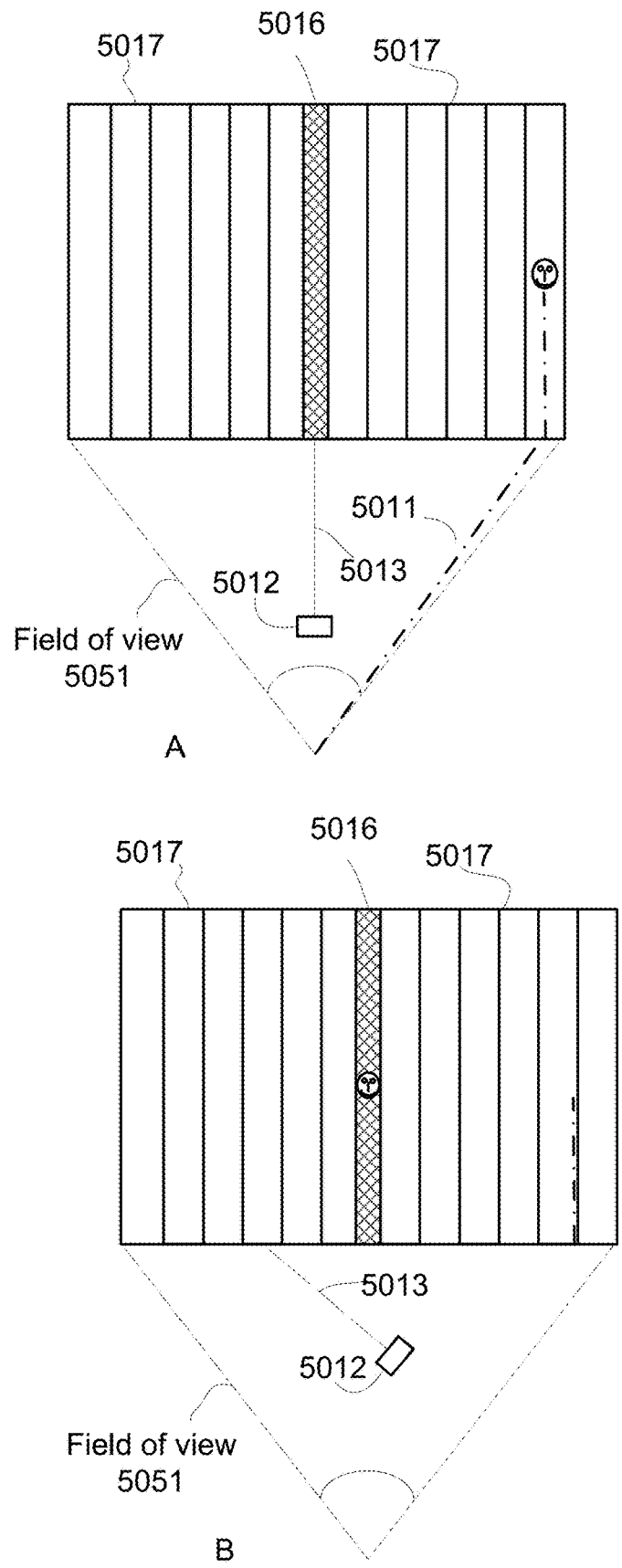
FIGS. 15G and 15H illustrate rotational movements of the V3DVCE.
Figure 15H:
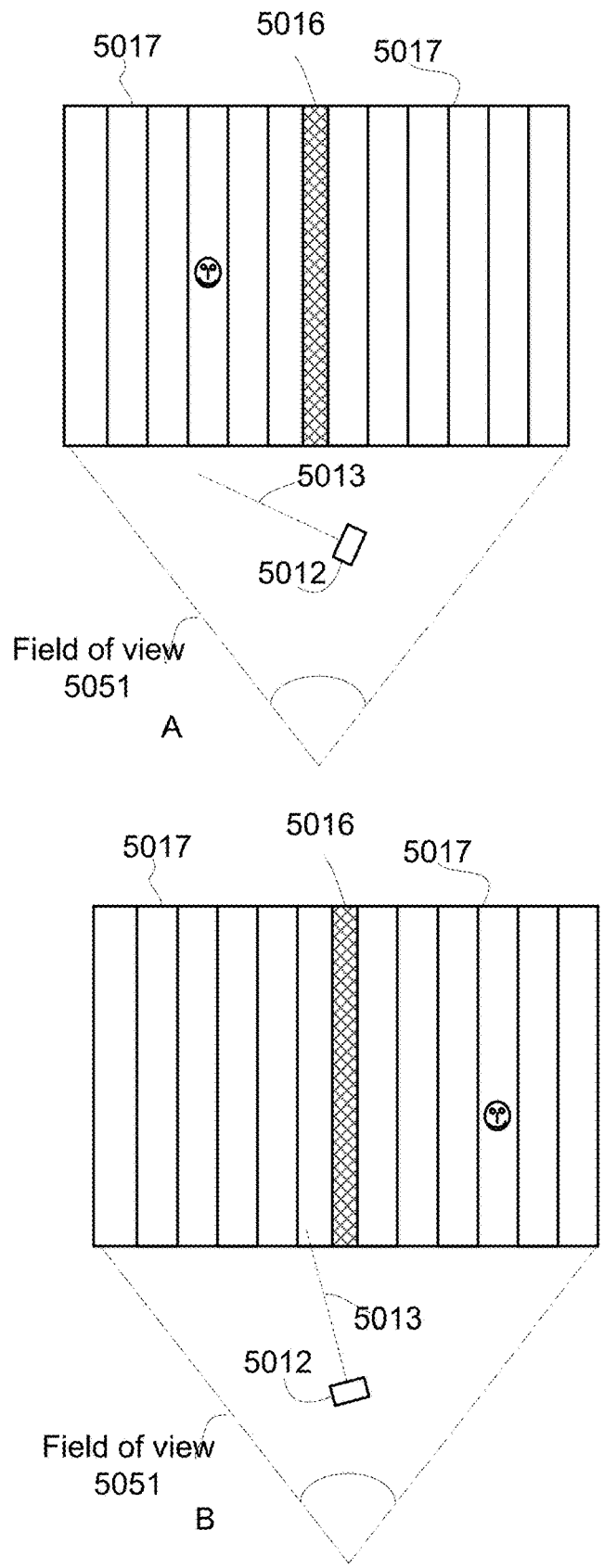

FIGS. 15G-15H illustrate a virtual rotation of the V3DVCE (illustrated by optical axis 5013 of VCP 5012) that was rotated counter clockwise.

An avatar that is located at an initial state of being (FIG. 15G, part A) at an almost rightmost part of the display—at a rightmost out-of-center region. The display includes center region 5016 and multiple out-of-center regions 5017.

FIG. 15G part B illustrates a rotation of V3DVCE that causes the avatar to be located at the center region 5011 of the display.

FIG. 15H part A illustrates a rotation of V3DVCE that causes the avatar to be located at an out-of-center region at the left side of the screen.

FIG. 15H part B illustrates a rotation of V3DVCE that causes the avatar to be located at an out-of-center region at the right side of the screen.

Any reference to right side may be applied mutatis mutandis to the left side.

Any reference to right side may be applied mutatis mutandis to an upper part or a lower part of the display.

Any reference to left side may be applied mutatis mutandis to a lower part or an upper part of the display.

Figure 15I:
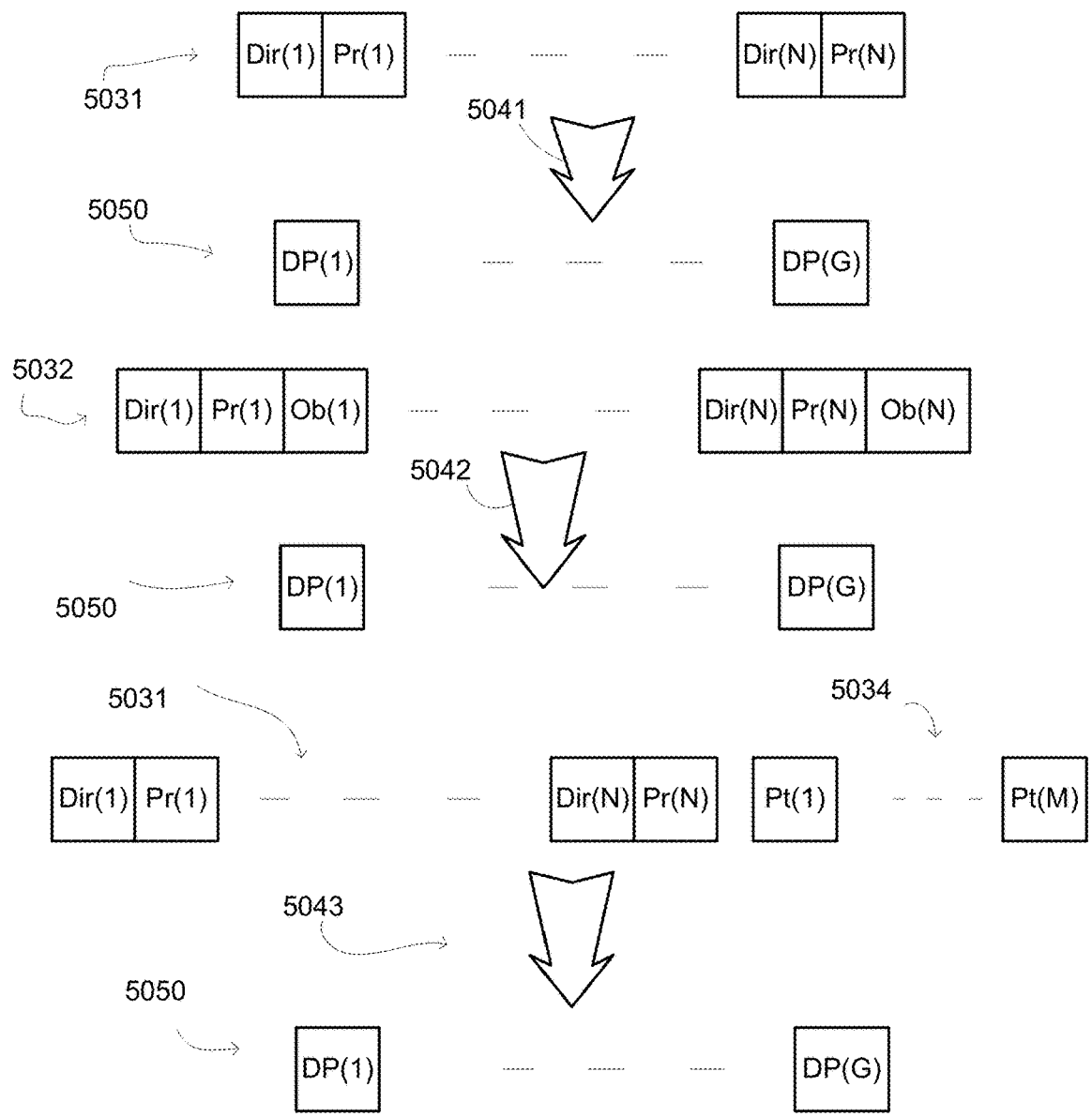
FIG. 15I illustrates examples of data structures and suggested changes in one or more display parameters of a V3DVCE.

FIG. 15I illustrates examples of data structures and suggested changes in one or more display parameters of a V3DVCE.

A participant gaze pattern may be represented in various manners.

For example—a participant gaze pattern may be represented by:

a. Direction of gaze information and duration of gaze per direction information. See for example participant gaze pattern information 5031 that includes direction of gaze information units Dir(1)-Dir(N), and duration of gaze per direction Pr(1)-Pr(N).
b. Direction of gaze information, duration of gaze per direction information, and viewed item. See for example participant gaze pattern information 5032 that includes direction of gaze information units Dir(1)-Dir(N), duration of gaze per direction information units Pr(1)-Pr(N), and the object (or item) being viewed information units Ob(1)-Ob(N).
c. Direction of gaze information, duration of gaze per direction information, and participants of the VC. See for example participant gaze pattern information 5031 and VC participants information 5034. The VC participants information includes VC participants information units Pt(1)-Pt(M). M may be smaller than N—as the number of changes in the participants of the virtual video conference is relatively limited.

The participant gaze pattern information may be converted (by conversion processes 5041, 5042 and 5043 respectively) to display parameters of the V3DVCE—such as V3DVCE display parameters DP(1)-DP(G) 5050.

Any reference to left side may be applied mutatis mutandis to a lower part or an upper part of the display.

Alpha Channel Information

The creation of credible avatars within virtual environments required a good blending of the avatar image with the virtual background.

Specifically, the problem mostly manifests itself at the hair of the avatar. Hair typically is very thin and practically takes less than one pixel in the created image. Therefore, in order to make it appear real, the color of the hair is blended with the color of the background. Blending is done according to the following formula:

$$P=alpha*hair\_color+(1-alpha)*background\_color$$

Where P is a three channel color (for example Red, Green and Blue) of a pixel, hair_color is the three channel color of the hair in pixel P, background_color is the three channel color of the background in pixel P and alpha is a channel transparency map—referred to as an alpha channel.

As can be seen from the mentioned above equation, each pixel is composed of an amount of hair color and an amount of background color. The ratio between the hair color amount and the background color amount is determined by the transparency channel. The transparency channel is a grayscale image containing floating point values between 0 to 1. A value of 0 means that the pixel gets only the color of the background while a value of 1 gives the pixel only the color of the hair. Any value between 0 and 1 mixes the colors of hair and background.

The values of hair_color and alpha depend on different parameters such as direction, pose and shape of the avatar as well as other such parameters. A machine learning process designed to render the avatar and the background needs to be trained in a way that would make the rendering appear as accurate and as real as possible.

There is a growing need to provide a solution that may generate alpha channel information in an effective manner—especially in real time and under a variety of person properties—such as pose, direction of gaze and expression.

The solution may be used for generating an avatar of a person—for example—during 3D virtual conference calls—but this is not necessarily so.

The solution should be accurate, simple (consume limited computational resources), and may provide alpha channel information in real time and/or under different person properties such as pose, direction and expression.

Figure 16A:
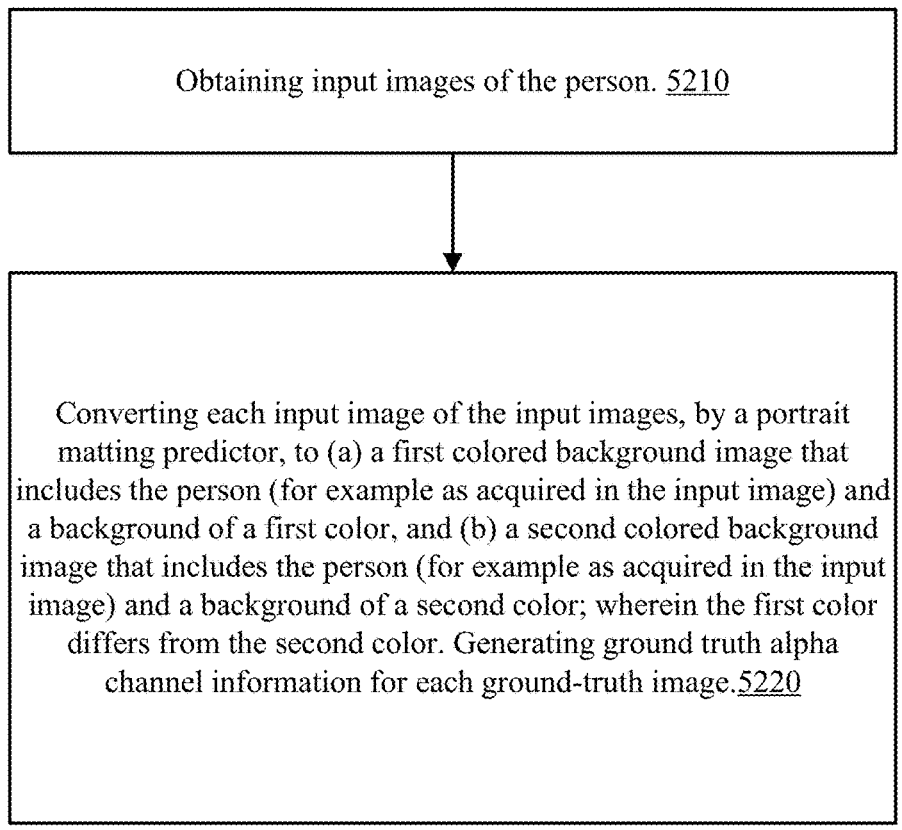
FIG. 16A illustrates an example of a method.

FIG. 16A illustrates an example of method 5200 for generating ground-truth alpha channel information.

The ground-truth alpha channel information can be used to train alpha channel machine learning process. The training results in an accurate generation of alpha channel of the alpha channel machine learning process.

Method 5200 may start by step 5210 of obtaining input images of the person.

Each image may include the person and an arbitrary background. The arbitrary background may include any compositions of objects and/or colors and/or shapes.

Step 5210 may be followed by step 5220 of converting each input image of the input images, by a portrait matting predictor, to (a) a first colored background image that includes the person (for example as acquired in the input image) and a background of a first color, and (b) a second colored background image that includes the person (for example as acquired in the input image) and a background of a second color; wherein the first color differs from the second color.

The portrait matting predictor may be a matting objective decomposition network (MODNET)—see, for example, "Is a Green Screen Really Necessary for Real-Time Portrait Matting?" Ke, Li, Zhou, Wu, Mao, Yan, and Lau, arXiv: 2011.11961v2 [cs.CV] 29 Nov. 2020.

Thus—for each input image two ground-truth images are generated—the first colored background image and the second colored background image.

The portrait matting predictor may be a robust video mating (RVM) that may process a video stream and convert input images of the person (from example input images of a video stream) to multiple ground truth images at once. The RVM may process one input image at a time or process multiple input images at once.

Step 5220 may require a limited amount of resources by calculating only the mentioned above two ground truth images per input image. It has been found that using two sets of identical images with different backgrounds is enough to provide a robust and accurate solution.

Step 5220 generates ground truth alpha channel information for each ground-truth image.

Figure 16B:
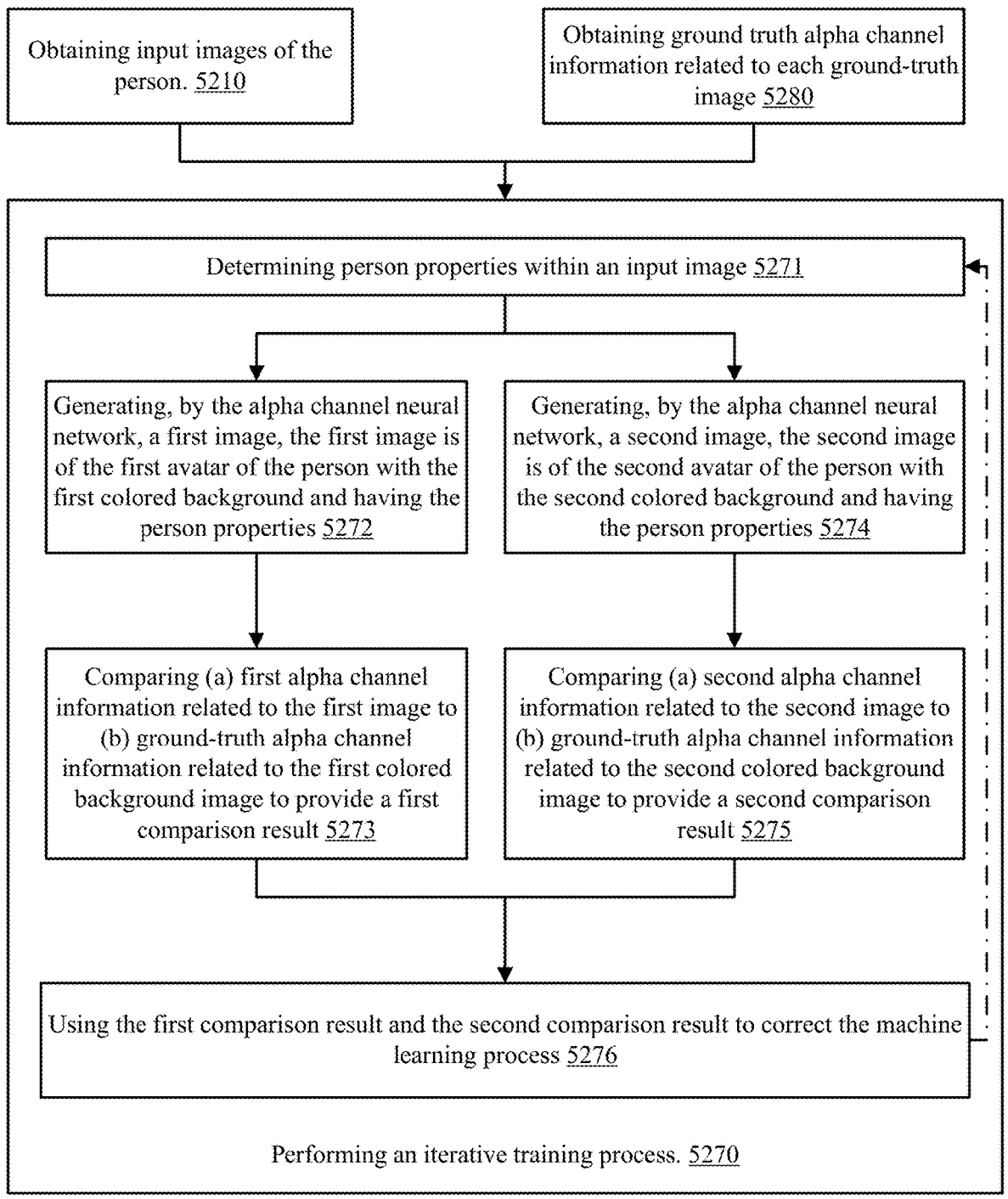
FIG. 16B illustrates an example of a method.

FIG. 16B illustrates an example of method 5250 for training an alpha channel machine learning process.

Method 5250 may start by steps 5210 and 5280. Step 5280 may include obtaining ground truth alpha channel information related to each ground-truth image. Step 5280 may use the output of method 5200.

Step 5210 may include obtaining input images of the person. Each image may include the person and an arbitrary background.

Step 5260 may include obtaining ground truth alpha channel information related to each ground-truth image. The ground truth alpha channel information may be generated during method 5200.

Steps 5210 and 5260 may be followed by an iterative training process denoted 5270.

Iterative process 5270 may include:
a. Step 5271 of determining person properties within an input image of the input images of step 5210. The input image may be selected in any manner.
a. Step 5272 of generating, by the alpha channel neural network, a first image, the first image is of the first avatar of the person with the first colored background and having the person properties.
b. Step 5273 of comparing (a) first alpha channel information related to the first image to (b) ground-truth alpha channel information related to the first colored background image to provide a first comparison result.
c. Step 5274 of generating, by the alpha channel neural network, a second image, the second image is of the second avatar of the person with the second colored background and having the person properties.
d. Step 5275 of comparing (a) second alpha channel information related to the second image to (b) ground-truth alpha channel information related to the second colored background image to provide a second comparison result.
e. Step 5276 of using the first comparison result and the second comparison result to correct the machine learning process. For example—the first comparison result and the second comparison result can be fed to a loss function, can be fed to a self-learning machine learning process and the like.
f. Selecting another input image and jumping to step 5271.

Figure 16C:
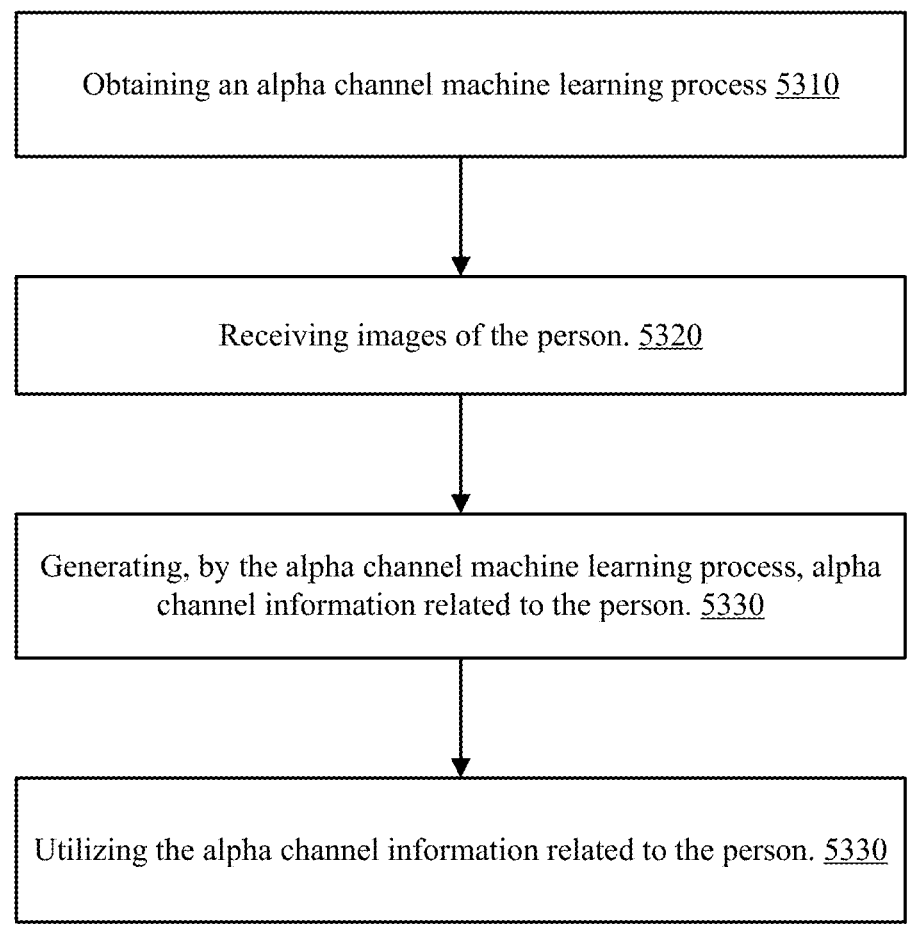
FIG. 16C illustrates an example of a method.

FIG. 16C illustrates an example of method 5300 for generating alpha channel information related to a person.

Method 5300 may start by step 5310 of obtaining an alpha channel machine learning process. The alpha channel machine learning process may have been trained using method 5250.

Step 5310 may be followed by step 5320 of receiving images of the person. The images may be a part of a video stream and may be acquired during a 3D video conference call.

Step 5320 may be followed by step 5330 of generating, by the alpha channel machine learning process, alpha channel information related to the person.

The generating may be accurate, may be executed in real time and may be resource consuming effective.

Step 5330 may be followed by step 5340 of utilizing the alpha channel information related to the person.

The utilizing may include at least one out of:
a. Generating an avatar of the person. This may require additional information and/or data structures such as a 3D model and one or more texture maps.
b. Transmitting the alpha channel information related to the person—especially the alpha channel information regarding to multiple images acquired during the 3D video conference to one or more other computerized systems that are involved in the 3D video conference. The computerized system may be a user device, a remote computerized system and the like.
c. Virtually including the avatar in a virtual 3D video conference environment (V3DVCE).

Method 5300 may include generating an avatar or may be added to any method of generating an avatar—for example any method illustrated in at least one out of (a) U.S. patent application Ser. No. 17/249,468 filing date Mar. 2, 2021, (b) U.S. provisional patent Ser. No. 63/023,836 filing date May 12, 2020, (c) U.S. provisional patent Ser. No. 63/081,860 filing date Sep. 22, 2020, (d) U.S. provisional patent Ser. No. 63/199,014 filing date Dec. 1, 2020, (e) U.S. patent application Ser. No. 17/304,378 filing date Jun. 20, 2021, or (f) U.S. patent application Ser. No. 17/539,036 filing date Nov. 30, 2021, all being incorporated herein by reference.

Moving avatars in a virtual 3D video conference environment (V3DVCE).

Examples of providing and maintaining a V3DVCE were illustrated in at least one out of (a) U.S. patent application Ser. No. 17/249,468 filing date Mar. 2, 2021, (b) U.S. provisional patent Ser. No. 63/023,836 filing date May 12, 2020, (c) U.S. provisional patent Ser. No. 63/081,860 filing date Sep. 22, 2020, (d) U.S. provisional patent Ser. No. 63/199,014 filing date Dec. 1, 2020, (e) U.S. patent application Ser. No. 17/304,378 filing date Jun. 20, 2021, or (f) U.S. patent application Ser. No. 17/539,036 filing date Nov. 30, 2021, all being incorporated herein by reference. Other V3DVCEs may be provided.

There is a growing need to represent participants in the V3DVCE in a reliable manner—especially while performing natural moves so that the setting fully recreates a feeling of viewing real people interacting within the virtual conference.

When creating avatars and having them move and replicate the human behaviour, it is beneficial to have them perform movements which seem natural.

The real participants of the virtual conference would be typically seated in front of a screen or a set of screens and would therefore perform only slight physical movements when moving their gaze from one point to another—for example from gazing at one participant to another participant—as both would appear to the participant within the screen and, therefore, within a small angular difference.

Figure 17A:
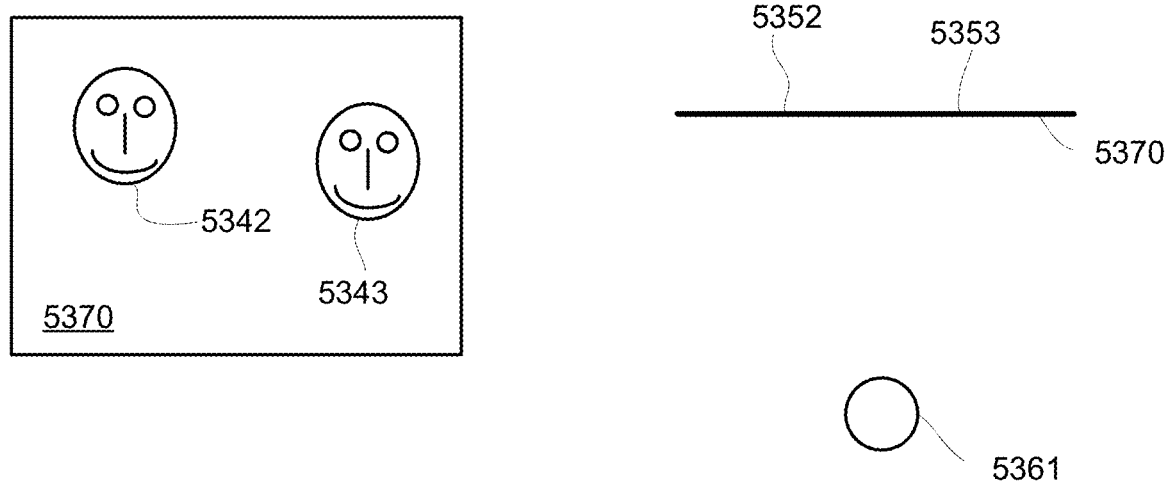
FIGS. 17A and 17B illustrates participants and their avatars.

Such a setting is shown in FIG. 17A. The left side of the figure shows two participant avatars (Second avatar 5342 and Third avatar 5343) as shown on the screen 5370 of First participant 5361. The right side of the figure shows a view from the top of First participant 5361 and the screen 5370. As one can see, there is a relatively small angle between a (displayed) location 5352 of Second avatar 5342 and a (displayed) location 5353 of Third avatar 5343 as seen by First participant 5361.

Figure 17B:
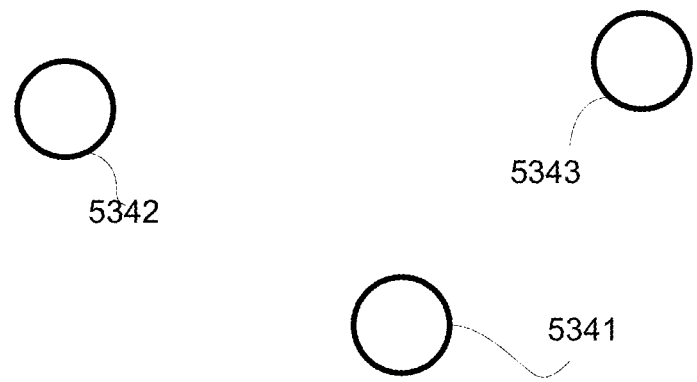

Suppose that within the virtual environment in which the conference virtually takes place the participant avatars are located as seen in FIG. 17B.

In FIG. 17B, one can see that the angular difference between Second avatar 5342 and Third avatar 5343 as seen by First avatar 5341 is much larger than as they appear to be seen by First participant 5361 in FIG. 17A.

Suppose First participant 5361, while looking at the screen, shifts his or her gaze from Second avatar 5342 to Third avatar 5343. Since they both appear on the screen, First participant 5361 can do this by a slight movement of the eyes, or may accompany this by an even slight movement of the head. However, reflecting this change of gaze within the virtual environment, having First avatar 5341 changing its gaze from Second avatar 5342 to gazing at Third avatar 5343, if done only by a movement of first avatar eyes and perhaps a slight movement of its head, would appear very unnatural. A different kind of adjustment is needed.

While this description discusses a lateral movement, it should be understood that it is correct for a movement on any axis or combination of axes.

In general, a lateral movement of a figure's gaze can be performed by a one or a combination of two to four movements: Movement of the body, Movement of the upper torso, Movement of the head, and Movement of the eyes.

Let the angular movement of the body be denoted by b, that of the torso by t, that of the head by h and that of the eyes by e.

In this case, the sum s=(b+t+h+e) is equal to the movement of the gaze of the avatar.

So, if the avatar is required to move its gaze by an angle of a, a combination of b, t, h and e should be chosen so that their sum, s, equals to a and they create a natural movement—one that looks like humans perform.

In order to find out what constitutes a normal and natural movement of humans, machine learning techniques can be employed.

For example, a machine learning process can be trained to learn how lateral movements of humans are separated into these four components. Such training can be performed for each specific individual and later applied to the avatar that reflects that individual. Alternatively, a network can be trained on a large population and apply its processing to any participating avatar.

Choosing the population for training may be based on common feature or features of the population—such as gender, height, age, etc. In this case, the avatar's features would determine how to apply the learned breakup of the movements to it. Additionally, this can be performed without segmenting the population at all.

FIG. 17C illustrates an example of method 5400 for changing a direction of gaze of an avatar within a virtual environment of a video conference.

Method 5400 may start by step 5410 of sensing that a certain participant of a video conference changes his direction of gaze from a first virtual item to a second virtual item. The sensing may involve image processing of images acquired by a camera that captures the participant.

The first virtual item and the second virtual item appear in a version of a virtual video conference environment that is displayed on a display of the certain participant.

The first virtual item may be a first participant. The second virtual item may be a second participant. The first virtual item and/or the second virtual item may differ from any of the participants of the virtual video conference.

Step 5410 may be followed by step 5420 of determining, by a machine learning process, at least one virtual movement of a certain participant avatar within the virtual environment that once applied shifts a direction of gaze within the virtual environment, of the certain participant avatar from the first virtual item to the second virtual item.

The certain participant avatar represents the certain participant.

The at least one virtual movement is selected out of (a) a virtual movement of eyes of the certain participant avatar, (b), a virtual movement of a head of the certain participant avatar (c), a virtual movement of a torso of the certain participant avatar, or (d) a virtual movement of a body of the certain participant avatar.

Step 5420 may be followed by step 5430 of responding to the determining.

The responding may include at least one out of:
a. Implementing the at least one movement—for example moving the certain participant avatar according to the determination.
b. Transmitting information regarding the determining to one or more other computerized systems that are involved in the 3D video conference. The computerized system may be a user device, a remote computerized system and the like.

The machine learning process may undergo a certain participant (also referred to an individual) training process during which the machine learning process is trained by a training process that comprises receiving videos of the certain participant while performing at least one actual movement; wherein the at least one actual movement is selected out of (a) a virtual movement of eyes of the certain participant avatar, (b), a virtual movement of a head of the certain participant avatar (c), a virtual movement of a torso of the certain participant avatar, or (d) a virtual movement of a body of the certain participant avatar.

Alternatively, the machine learning process may undergo a non-specific training process during which the machine learning process is trained by a training process that comprises receiving videos of multiple persons while performing at least one actual movement; wherein the at least one actual movement is selected out of (a) a virtual movement of eyes of the certain participant avatar, (b), a virtual movement of a head of the certain participant avatar (c), a virtual movement of a torso of the certain participant avatar, or (d) a virtual movement of a body of the certain participant avatar.

FIG. 17D illustrates an example of method 5450 for changing a direction of gaze of an avatar within a virtual environment of a video conference.

Method 5450 may start by step 5410 of sensing that a certain participant of a video conference changes his direction of gaze from a first virtual item to a second virtual item. The sensing may involve image processing of images acquired by a camera that captures the participant.

The first virtual item and the second virtual item appear in a version of a virtual video conference environment that is displayed on a display of the certain participant.

The first virtual item may be a first participant. The second virtual item may be a second participant. The first virtual item and/or the second virtual item may differ from any of the participants of the virtual video conference.

Step 5410 may be followed by step 5460 of determining, by a machine learning process, at least one virtual movement of a certain participant avatar within the virtual environment that once applied shifts a direction of gaze within the virtual environment, of the certain participant avatar from the first participant avatar to the second virtual item.

The least one virtual movement may include at least one out of (a) a virtual movement of eyes of the certain participant avatar, or (b) one or more additional virtual movements that differ from the virtual movement of eyes of the certain participant avatar.

The at least one virtual movement may include the virtual movement of eyes of the certain participant avatar and one or more additional virtual movements.

The one or more additional virtual movements may include a combination of one or more of (a) a virtual movement of a torso of the certain participant avatar, (b) a virtual movement of a head of the certain participant avatar, or (c) a virtual movement of a body of the certain participant avatar.

Step 5460 may be followed by step 5470 of responding to the determining.

The responding may include at least one out of:
a. Implementing the at least one movement—for example moving the certain participant avatar according to the determination.
b. Transmitting information regarding the determining to one or more other computerized systems that are involved in the 3D video conference. The computerized system may be a user device, a remote computerized system and the like.

The machine learning process may have been trained by a training process that includes receiving videos of the certain participant while performing at least one actual movement; wherein the at least one actual movement comprises at least one out of (a) an actual movement of eyes of the certain participant, or (b) one or more additional actual movements that differ from the actual movement of eyes of the certain participant.

The machine learning process may have been trained by a training process that comprises receiving videos of multiple persons while performing at least one actual movement; wherein the at least one actual movement comprises at least one out of (a) an actual movement of eyes of the multiple persons, or (b) one or more additional actual movements that differ from the actual movement of eyes of the multiple persons.

There may be a difference between at least one actual movement of the certain participant that led to the change to the direction of gaze and between the at least virtual movement of the certain participant avatar.

The determining of the at least one virtual movement of the certain participant avatar can be made regardless of the at least one actual movement of the certain participant.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the disclosure described herein are, for example, capable of operation in other orientations than those illustrated or otherwise described herein.

The connections as discussed herein may be any type of connection suitable to transfer signals from or to the respective nodes, units, or devices, for example via intermediate devices. Accordingly, unless implied or stated otherwise, the connections may for example be direct connections or indirect connections. The connections may be illustrated or described in reference to be a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above-described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also, for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to embodiments of the disclosure s containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the embodiments of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the embodiments of the disclosure.

We claim:

1. A method for generating alpha channel information related to a person, the method comprises:
    generating the alpha channel information related to the person by an alpha channel neural network; wherein the alpha channel machine learning process is trained using ground truth alpha channel information that is associated with background information;
    wherein the ground-truth alpha channel information is generated by:
        obtaining input images of the person; wherein each image comprises the person and an arbitrary background;
        repeating, for each input image of the input images, converting the input image, by a portrait matting predictor, to (a) a first colored background image that comprises the person and a background of a first color, and (b) a second colored background image that comprises the person and a background of a second color;
        wherein the first color differs from the second color;
    wherein the training comprises:
        repeating, for each input image of the input images:
        i. determining person properties within the input image;
        ii. generating, by the alpha channel neural network, a first image, the first image is of the first avatar of the person with the first colored background and having the person properties;
        iii. comparing first alpha channel information related to the first image to ground-truth alpha channel information related to the first colored background image to provide a first comparison result;
        iv. generating, by the alpha channel neural network, a second image, the second image is of the second avatar of the person with the second colored background and having the person properties; and
        v. comparing second alpha channel information related to the second image to ground-truth alpha channel information related to the second colored background image to provide a second comparison result.

2. The method according to claim 1 wherein the portrait matting predictor is a matting objective decomposition network.

3. The method according to claim 1 wherein the first color is blue and the second color is green.

4. The method according to claim 1 comprising obtaining images of the person in real time; and wherein the generating comprises generating alpha channel information from the images of the person in real time.

5. The method according to claim 4 wherein the images are obtained during virtual video conferencing.

6. The method according to claim 1, comprising utilizing the first and second comparison results to update the alpha channel neural network.

7. The method according to claim 1 further comprising generating an avatar of the person.

8. The method according to claim 7 wherein the generating of the avatar of the person comprises utilizing the alpha channel information related to the person.

9. The method according to claim 8 wherein the generating of the avatar of the person comprises generating a three-dimensional model and one or more texture maps of the person.

10. The method according to claim 1 wherein the portrait matting predictor is a robust video matting predictor.

11. A non-transitory computer readable medium for generating alpha channel information related to a person, the non-transitory computer readable medium stores instructions for:
    generating the alpha channel information related to the person by an alpha channel neural network; wherein the alpha channel machine learning process is trained using ground truth alpha channel information that is associated with background information;
    wherein the ground-truth alpha channel information is generated by:
        obtaining input images of the person; wherein each image comprises the person and an arbitrary background;
        repeating, for each input image of the input images, converting the input image, by a portrait matting predictor, to (a) a first colored background image that comprises the person and a background of a first color, and (b) a second colored background image that comprises the person and a background of a second color;
        wherein the first color differs from the second color;
    wherein the training comprises:
        repeating, for each input image of the input images:
        i. determining person properties within the input image;
        ii. generating, by the alpha channel neural network, a first image, the first image is of the first avatar of the person with the first colored background and having the person properties;
        iii. comparing first alpha channel information related to the first image to ground-truth alpha channel information related to the first colored background image to provide a first comparison result;

iv. generating, by the alpha channel neural network, a second image, the second image is of the second avatar of the person with the second colored background and having the person properties; and v. comparing second alpha channel information related to the second image to ground-truth alpha channel information related to the second colored background image to provide a second comparison result.

12. The non-transitory computer readable medium according to claim 11 wherein the portrait matting predictor is a matting objective decomposition network.

13. The non-transitory computer readable medium according to claim 11 wherein the first color is blue and the second color is green.

14. The non-transitory computer readable medium according to claim 11 that stores instructions for obtaining images of the person in real time; and wherein the generating comprises generating alpha channel information from the images of the person in real time.

15. The non-transitory computer readable medium according to claim 14 wherein the images are obtained during virtual video conferencing.

16. The non-transitory computer readable medium according to claim 11 that stores instructions for utilizing the first and second comparison results to update the alpha channel neural network.

17. The non-transitory computer readable medium according to claim 11 further that stores instructions for generating an avatar of the person.

18. The non-transitory computer readable medium according to claim 17 wherein the generating of the avatar of the person comprises utilizing the alpha channel information related to the person.

19. The non-transitory computer readable medium according to claim 11 wherein the portrait matting predictor is a robust video matting predictor.

20. A non-transitory computer readable medium for generating alpha channel information related to a person, the non-transitory computer readable medium stores instructions for:

generating the alpha channel information related to the person by an alpha channel neural network; wherein the alpha channel machine learning process is trained using ground truth alpha channel information that is associated with background information;

wherein the ground-truth alpha channel information is generated by:

obtaining input images of the person; wherein each image comprises the person and an arbitrary background;

repeating, for each input image of the input images, converting the input image, by a portrait matting predictor, to (a) a first colored background image that comprises the person and a background of a first color, and (b) a second colored background image that comprises the person and a background of a second color;

wherein the first color differs from the second color;

wherein the generating of the avatar of the person comprises utilizing the alpha channel information related to the person; and wherein the generating of the avatar of the person comprises generating a three-dimensional model and one or more texture maps of the person.

\* \* \* \* \*